United States Patent
Smittle et al.

(10) Patent No.: US 11,740,973 B2
(45) Date of Patent: Aug. 29, 2023

(54) INSTRUCTION ERROR HANDLING

(71) Applicant: Cadence Design Systems, Inc., San Jose, CA (US)

(72) Inventors: Matthew B. Smittle, Allen, TX (US); Jama Ismail Barreh, Austin, TX (US); Robert T. Golla, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 214 days.

(21) Appl. No.: 17/173,093

(22) Filed: Feb. 10, 2021

(65) Prior Publication Data

US 2022/0164254 A1 May 26, 2022

Related U.S. Application Data

(60) Provisional application No. 63/117,300, filed on Nov. 23, 2020.

(51) Int. Cl.
| | |
|---|---|
| *G06F 11/00* | (2006.01) |
| *G06F 11/14* | (2006.01) |
| *G06F 9/38* | (2018.01) |
| *G06F 11/07* | (2006.01) |

(52) U.S. Cl.
CPC ........ *G06F 11/1405* (2013.01); *G06F 9/3802* (2013.01); *G06F 9/3861* (2013.01); *G06F 9/3867* (2013.01); *G06F 11/0766* (2013.01); *G06F 11/0751* (2013.01)

(58) Field of Classification Search
CPC ............ G06F 11/1405; G06F 11/0751; G06F 11/0766; G06F 11/07
USPC ....................................................... 714/1–57
See application file for complete search history.

(56) References Cited

U.S. PATENT DOCUMENTS

| | | | |
|---|---|---|---|
| 6,101,614 A | 8/2000 | Gonzales et al. | |
| 6,823,424 B2 * | 11/2004 | Larson ................ | G06F 11/1076 714/6.32 |
| 7,302,619 B1 * | 11/2007 | Tompkins ........... | G06F 11/1064 712/231 |
| 7,332,929 B1 * | 2/2008 | Normoyle .......... | G01R 31/3177 714/39 |
| 8,683,290 B2 | 3/2014 | Koshiyama et al. | |
| 8,732,550 B2 | 5/2014 | Ohnuki et al. | |
| 2001/0029592 A1 * | 10/2001 | Walker .................. | G06F 11/106 714/42 |
| 2001/0044917 A1 * | 11/2001 | Lester .................... | G11C 29/52 365/201 |

(Continued)

*Primary Examiner* — Sarai E Butler
(74) *Attorney, Agent, or Firm* — Mark H. Whittenberger; Holland & Knight LLP

(57) ABSTRACT

An instruction storage circuit within a processor that includes an instruction memory and a memory control circuit. The instruction memory is configured to store instructions of a program for the processor. The memory control circuit is configured to receive a particular instruction from the instruction memory, detect a data integrity error in the particular instruction, and generate and store a corrected version of the particular instruction in an error storage circuit within the instruction memory. A flush of an execution pipeline may be performed in response to the error. In response to a refetch of the particular instruction after the pipeline flush, the instruction storage circuit may be configured to cause the particular instruction to be provided from the error storage circuit to the execution pipeline to permit forward progress of the processor.

19 Claims, 14 Drawing Sheets

(56) References Cited

U.S. PATENT DOCUMENTS

| | | | |
|---|---|---|---|
| 2004/0054847 A1* | 3/2004 | Spencer | G06F 13/1673 711/104 |
| 2004/0168102 A1* | 8/2004 | Tsunoda | G11B 20/18 |
| 2004/0230975 A1* | 11/2004 | Gewirtz | G06F 9/3851 712/E9.032 |
| 2005/0081085 A1* | 4/2005 | Ellis | G06F 11/1044 714/E11.041 |
| 2005/0138465 A1* | 6/2005 | Depew | G06F 11/1666 714/5.11 |
| 2006/0039210 A1* | 2/2006 | Blodgett | G11C 17/16 365/200 |
| 2007/0043975 A1* | 2/2007 | Varadarajan | G06F 11/1438 714/25 |
| 2007/0050563 A1* | 3/2007 | Alsup | G06F 9/30047 711/145 |
| 2007/0186135 A1 | 8/2007 | Flachs et al. | |
| 2009/0077425 A1* | 3/2009 | Gschwind | G06F 11/1064 714/42 |
| 2010/0185904 A1* | 7/2010 | Chen | G06F 12/0895 711/E12.001 |
| 2011/0145632 A1* | 6/2011 | Waldspurger | G06F 11/08 714/6.1 |
| 2011/0173482 A1* | 7/2011 | Penton | G06F 11/1641 714/E11.178 |
| 2012/0127818 A1* | 5/2012 | Levy | G06F 13/16 365/230.03 |
| 2012/0221884 A1* | 8/2012 | Carter | G06F 11/0772 714/2 |
| 2013/0086417 A1* | 4/2013 | Sivaramakrishnan | G06F 9/30 714/E11.085 |
| 2014/0089598 A1* | 3/2014 | DeBruyne | G06F 9/30149 711/140 |
| 2014/0136891 A1* | 5/2014 | Holmer | G06F 9/3842 714/15 |
| 2014/0289570 A1* | 9/2014 | Lewis | G06F 11/3089 714/43 |
| 2015/0106677 A1* | 4/2015 | Greenfield | G06F 11/1008 714/767 |
| 2015/0370683 A1* | 12/2015 | Nishiyama | G06F 11/3419 714/43 |
| 2021/0165721 A1* | 6/2021 | Blagodurov | G06F 11/076 |

* cited by examiner

| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| F1 | I* | J | | D | E | F | G | H | I | J | K | L | M | N | O | | | K |
| F2 | H | I* | J | | D | E | F | G | H | I | | | | | | O | J | J |
| Align | G | H | I* | | | D | E | F | G | H | I | | | | | N | | |
| Decode | F | G | H | | | | D | E | F | G | H | I | | | | M | | |
| EX1 | E | F | G | | | | | D | E | F | G | H | I | | | L | | |
| EX2 | D | E | F | | | | | | D | E | F | G | H | I | | K | | |
| EX3 | C | D | E | | | | | | | | | F | G | H | I | J | | |
| EX4/Commit | B | C | D-RFPC D | | | | | | | | D | E | F | G | H | I-RFNPC | | |
| WB | A | B | C | | | | | | | | | D | E | F | G | H | I | |

*FIG. 9*

INSTRUCTION ERROR HANDLING

RELATED APPLICATION

The present application claims priority to U.S. Provisional Appl. No. 63/117,300, filed Nov. 23, 2020, the disclosure of which is incorporated by reference herein in its entirety.

BACKGROUND

Technical Field

This disclosure relates to instruction processing in a computer system, and in particular to handling errors in instructions retrieved from memory.

Description of the Related Art

Computer systems can employ multiple processors or processor cores to perform various tasks by executing software or program instructions. Such software or program instructions can be stored in multiple memory circuits. To improve performance of computer system, the memory circuits may be arranged in hierarchical fashion, with faster access memory circuits located closer to the processors or processor cores. In addition to storing software or program instructions, the memory circuits may also store data (e.g., audio or video data) upon which the processors may perform various operations.

To execute software or program instructions, processors retrieve or "fetch" the instructions from the memory circuits. Once an instruction has been fetched, a processor may begin a series of operations in order to execute the instruction. Many processors employ multiple stages arranged in a pipelined fashion to sequentially perform the operations needed to execute a given instruction. As the given instruction moves through the different stages, each stage performs a different operation. Finally, the instruction is completed by the processor.

By employing such a pipelined structure, different operations can be performed on multiple instructions in parallel. For example, while a decode operation is being performed in conjunction with one instruction, an arithmetic operation may be performed for a different instruction. Processors or processor cores that employ a pipelined architecture can improve instruction throughput at the expense of a latency to initially fill the stages of the pipeline. Once the pipeline is "full," each cycle will result in the completion of an instruction.

SUMMARY

The present disclosure describes a technique for helping to ensure forward progress of a processor in the presence of persistent data integrity errors in instructions received from an instruction memory. An instruction storage circuit is disclosed that detects data integrity errors in an instruction, generates a corrected version of the error-generating instruction, and stores the corrected version in an error storage. After a pipeline flush caused by the error, the processor begins to refetch a group of instructions that were not yet complete, including the error-generating instruction. The instruction storage circuit is configured to recognize, based on saved state information, when the error-generating instruction is being refetched. In response, the instruction storage circuit will provide the corrected version of the instruction in the error storage to the execution pipeline for execution. By providing the corrected version from the error storage, this prevents a scenario in which the error-generating instruction is instead fetched from the same location in the instruction memory. This location may still exhibit the data integrity error, and refetching from this location might lead to a series of repeated pipeline flushes and an eventual timeout.

The present disclosure also contemplates that the instruction storage circuit may also write the corrected version of the error-generating instruction back to the same location in instruction memory. When that instruction is refetched, although the corrected version will be supplied from the error storage, the instruction storage circuit may perform a comparison of the contents of the location in instruction memory to the error storage. As such, this allows the instruction storage circuit to determine if the error is persistent, and potentially mark the offending location in instruction memory from being used going forward.

In some implementations, only one error may be handled at a time. Thus, when a first data integrity error is detected, it may be handled as described above, and further error checking is suspended. After the error-generating instruction is refetched after a first pipeline flush, a second pipeline flush may happen upon the error-generating instruction being completed by the execution pipeline. The second pipeline flush may cause instructions to be refetched at the next program counter after the error-originating instruction. Error checking is then resumed.

BRIEF DESCRIPTION OF THE DRAWINGS

FIG. 9 is a timing diagram that illustrates, using the example execution pipeline of FIG. 3, detection of an instruction error, a flush of the pipeline, and an instruction refetch.

DETAILED DESCRIPTION

Figure 1:
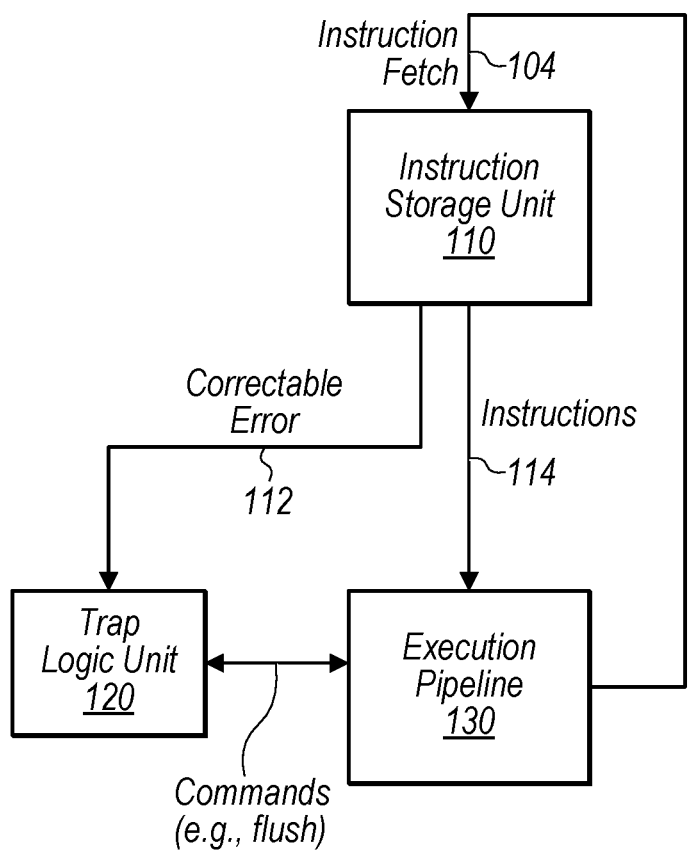
FIG. 1 is a block diagram of one embodiment of a processor that includes an instruction storage circuit, a trap logic unit, and an execution pipeline.

Computer systems can include one or more processor circuits that retrieve or "fetch" instructions from memory circuits. Once an instruction has been fetched, a processor performs various operations (e.g., instruction decode) in order to execute the fetched instruction. An instruction includes multiple bits that may be arranged in various fields that correspond to different portions of the instruction. For example, one field may specify a type of operation to be performed, while another field may specify an address location of an operand. In some cases, a fetched instruction may contain one or more errors, where the intended values for one or more of the bits are incorrect. This type of error is referred to in this disclosure as a "data integrity error." Prior to executing an instruction, a processor checks the instruction for such errors using additional bits included in the instruction. In many cases, processors can correct the error using extra bits included in the instruction. These bits may be referred to as error-correcting code or "ECC" bits.

Processors may employ an instruction pipeline system to execute the instructions that they fetch from memory. Instruction pipelines are typically employed to allow overlapping execution of multiple instructions with the same circuitry. Circuitry within an instruction pipeline is divided into stages, each of which performs a specific operation associated with the execution of an instruction, passing partial results to subsequent stages. Different processors include different types and different numbers of stages in their instruction pipelines. For example, an instruction pipeline can include a stage the that fetches an instruction, a stage that decodes an instruction, a stage that performs arithmetic or logic operations specified in an instruction, and the like. Some stages employ a single cycle to perform their corresponding operation, while other stages may employ multiple cycles.

Once an instruction is fetched from memory, a processor checks the fetched instruction for errors. In response to a determination that the fetched instruction contains an error, operation of the instruction pipeline of the processor is stopped, and the instruction pipeline is flushed and then reloaded. As used herein, flushing an instruction pipeline refers to cancelling instructions currently being executed in the pipeline. In some cases, flushing may include resetting any state variables or registers to known values prior to resuming operation. Flushes of instruction pipelines in response to an error detection in a fetched instruction are typically employed to prevent the processor for entering an unknown state due to the error, which could result in a need to reset or restart the processor.

Once the flush is complete, the processor continues operation by resuming instruction fetching starting with the last instruction that did not complete before the flush. While the pipeline is being flushed and reloaded, if the fetched instruction that initiated the flush is determined to have a correctable error, the processor may attempt to correct the error using error correcting code (ECC) bits contained in the instruction, and a corrected version of the instruction is written back to the location in memory from which it was fetched. In other cases, the processor may fetch a clean copy of the instruction from a higher-level memory circuit and write it to the location in memory from which it was originally fetched. In the context of this disclosure, when a first memory circuit is said to be at a "higher level" of memory relative to a second memory circuit, this means that the first memory circuit has a greater latency than the second memory circuit. As the memory level increases, response times are slower, capacity increases, and memory typically becomes less expensive. An L1 cache is at a higher level of memory hierarchy than an L0 cache, for example.

While using the time during an instruction pipeline flush to correct an instruction with an error or fetch a clean copy of the instruction can allow forward progress in most cases, when an error in an instruction is "persistent," performance of a processor may be impacted. For a persistent error, a refetch of the instruction from a higher level of memory does not fix the error. Such persistent errors can result from malfunctioning data storage cells at the location in the memory from which the instruction is being fetched, or the location in the instruction memory to which a corrected version of the instruction is being written. The malfunctioning data storage cells (commonly referred to as "stuck bits") may have been damaged during manufacturing, or they may have worn out over time, and typically cannot be repaired. In such cases, the processor may become stuck in a loop of flushing, reloading, error correcting, writing back, and refetching. The loop may continue until a timeout is reached, preventing any further progress in programs being run. In some cases, the only way for the processor to exit the loop may be a reset of the processor.

Techniques in the present disclosure are based on a recognition that using a different storage circuit (broadly, "error storage") to store a corrected version of the instruction during the flush can prevent a processor from looping due to a persistent error, thereby allowing forward progress. Rather than refetching the instruction from a potentially damaged memory location, the processor instead refetches the instruction from the error storage, allowing the instruction pipeline to operate on a corrected version of the instruction. In some cases, the use of the error storage can also reduce a number of times a processor needs to fetch a clean instruction from a higher-level memory, further improving performance by eliminating memory latency.

Turning now to FIG. 1, a block diagram depicting an embodiment of a processor circuit (or processor 100) is shown. As illustrated, processor 100 includes instruction storage circuit 110, execution pipeline 130, and trap logic unit 120.

Execution pipeline 130 is configured to generate instruction fetch 104 and send it to instruction storage circuit 110. As described below, in response to receiving instruction fetch 104, instruction storage circuit 110 will respond with instructions 114. Execution pipeline 130 is also configured to execute instructions 114 received from instruction storage circuit 110.

Figure 3:
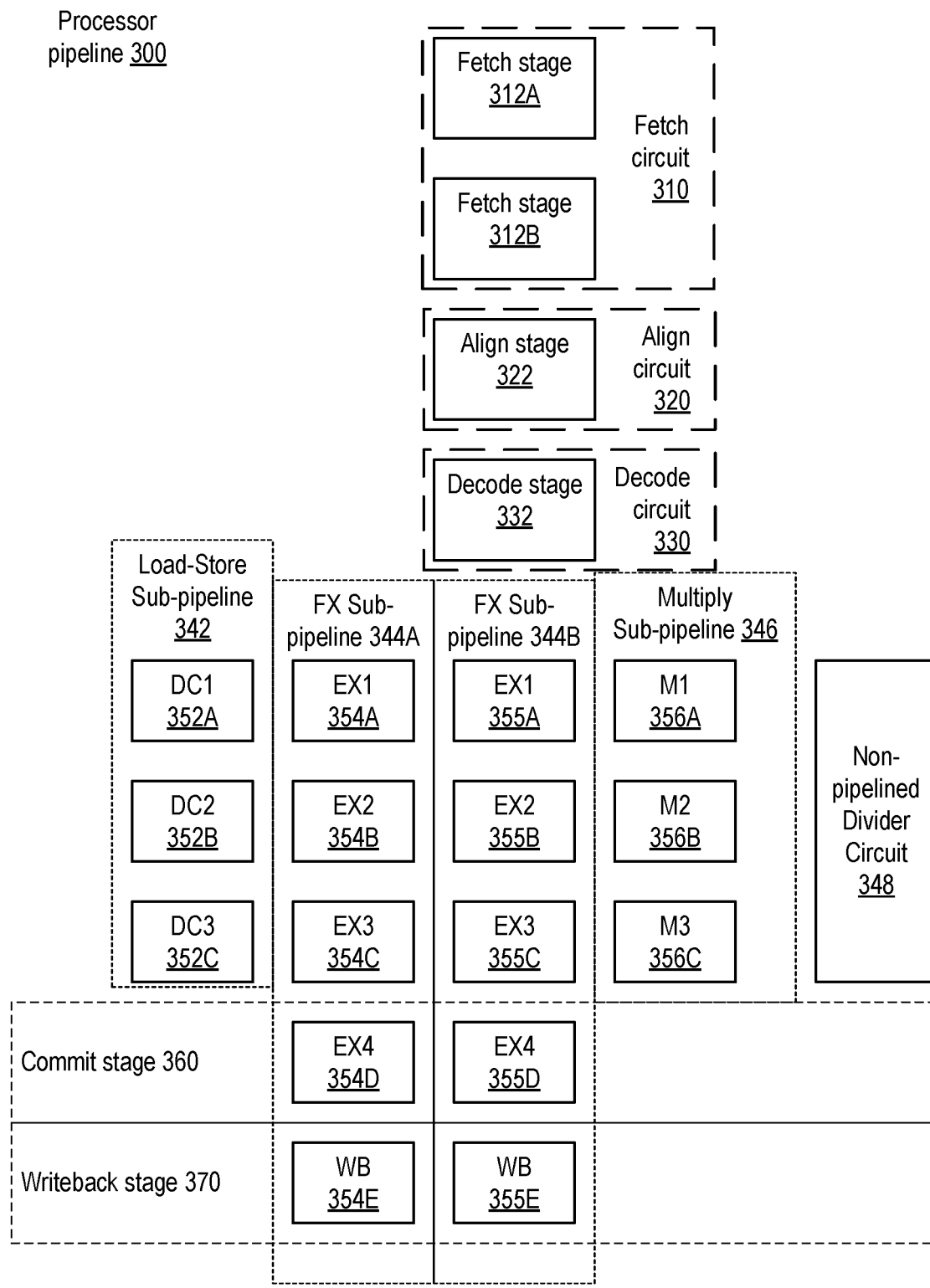
FIG. 3 is a block diagram of one embodiment of an execution pipeline.

As described below, execution pipeline 130 can include multiple stages, each performing respective functions associated with the execution of a particular one of instructions 114. For example, execution pipeline 130 may include one or more stages configured to retrieve instructions 114 from instruction storage circuit 110. The pipeline may also include stages configured to perform arithmetic and logic operations such as addition, shift, multiply, and the like. FIG. 3 provides one example of stages in an execution pipeline.

Trap logic unit 120 is configured to cause a flush of instructions from execution pipeline 130 and a subsequent reload of the pipeline in response to receiving correctable error signal 112 from instruction storage circuit 110. Correctable error signal 112 is indicative of an error in a particular instruction of instructions 114. In various embodiments, trap logic unit 120 may implement a state machine or other sequential logic which includes inputs indicating that various error conditions have occurred in the processor 100, and may generate control signals for the various components in processor 100 that are employed to correct the errors in order to proceed with execution of instructions.

In various embodiments, instruction storage circuit 110 includes an instruction memory that includes an error storage. The "error storage" may also be referred to variously as an error buffer circuit or a redundant portion of memory (in contrast to a non-redundant portion of the instruction memory that stores instructions). Instruction storage circuit 110 is configured to receive instruction fetch 104 for a particular instruction, and to detect, in a storage location in the instruction memory, a data integrity error in the particular instruction. As used herein, a data integrity error refers to a condition in which one or more bits included in an instruction have changed from their respective original values. A data integrity error may be detected using parity or ECC bits in various embodiments.

Instruction storage circuit 110 is further configured, in response to detecting the data integrity error, to signal the trap logic unit 120 to cause a flush and reload of instructions from the execution pipeline 130, and is further configured to generate, during the flush and reload, a corrected version of the particular instruction, and to store the corrected version in the redundant portion of the instruction memory included in instruction storage circuit 110. Instruction storage circuit 110 is further configured, after the execution pipeline 130 completes the flush and reload, to receive a request for a refetch of the particular instruction, and, in response to the request, provide, from the redundant portion of the instruction memory, the particular instruction to the execution pipeline 130. This methodology avoids using the memory location which contains malfunctioning data storage cells, and fetches the corrected version of the instruction, allowing execution of instruction to resume.

As described below, instruction storage circuit 110 may also include a memory control circuit in addition to the instruction memory. The memory control circuit may, in some embodiments, be configured to detect errors in an instruction, and correct the errors using error correction code bits contained within the instruction. In various embodiments, the instruction memory may be implemented as a cache, a closely coupled memory, or any suitable memory architecture.

Figure 2:
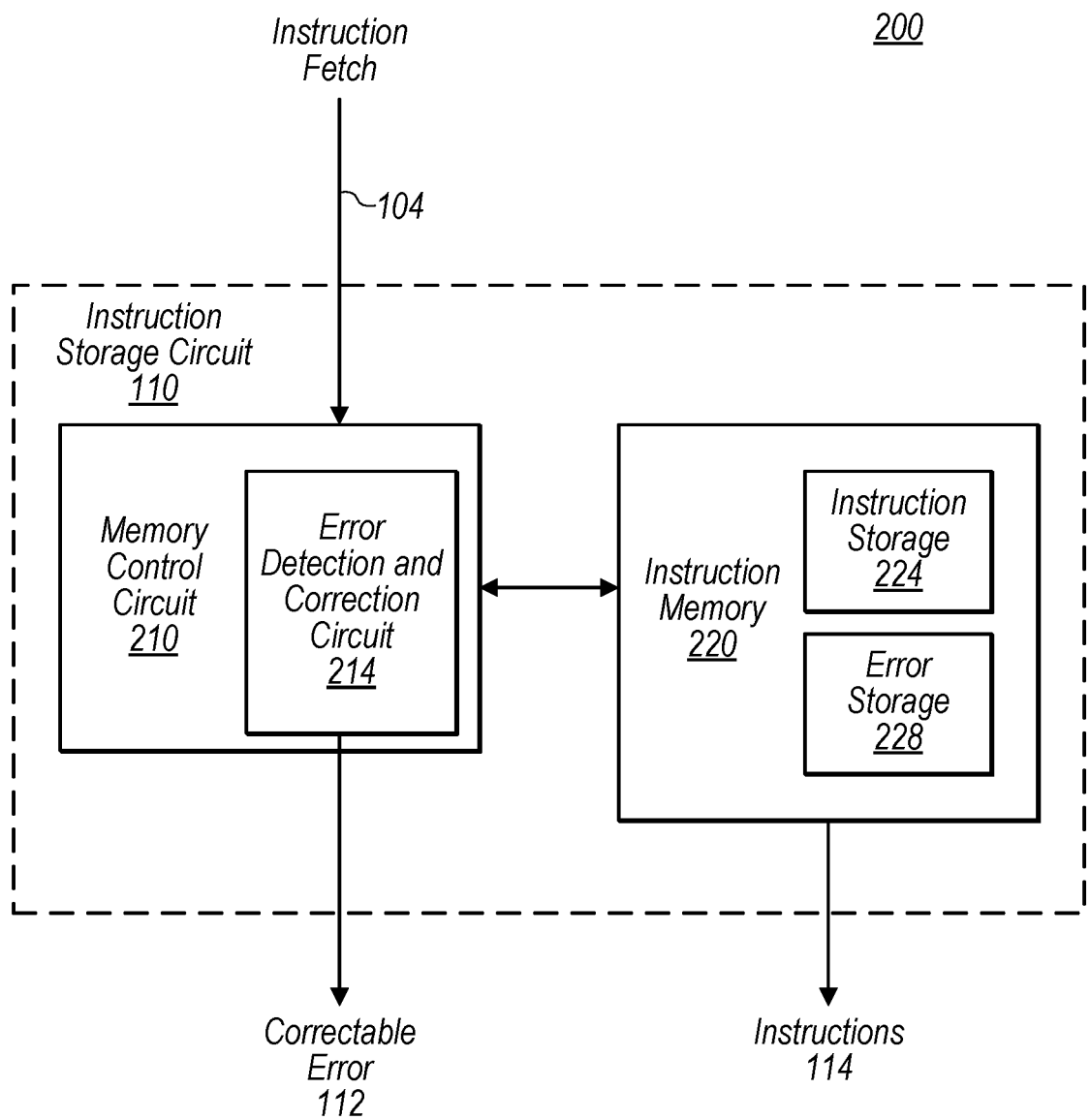
FIG. 2 is a block diagram of one embodiment of an instruction storage circuit that includes a memory control circuit and an instruction memory.

Turning now to FIG. 2, a block diagram depicting an embodiment of instruction storage circuit 110 is shown. As illustrated, instruction storage circuit 110 includes memory control circuit 210, error detection and correction 214, and instruction memory 220. Note that instruction storage circuit 110 operates independently of execution pipeline 130 in the depicted embodiment, such that instruction error detection and correction is performed transparently with respect to the fetch and other stages of execution pipeline 130.

Instruction memory 220 includes instruction storage 224 and error storage 228. In various embodiments, instruction memory 220 is configured to store a plurality of instructions. Such instructions may correspond to portions of a program or application. In the event of an error in an instruction stored in instruction storage 224, error storage 228 is configured to store a corrected version of the instruction.

In various embodiments, instruction storage 224 may be a cache, or closely coupled memory, or any structure suitable for instruction storage and retrieval. Error storage 228 may be configured to store a corrected version of a particular instruction. In some cases, instruction memory 220 may be implemented as a single memory circuit, and instruction storage 224 and error storage 228 correspond to different address regions within instruction memory 220. In other embodiments, instruction storage 224 and error storage 228 may be implemented as different banks within instruction memory 220. Alternatively, instruction storage 224 and error storage 228 may be implemented as separate memory circuits. Although only one instruction storage region and one error storage region are depicted in instruction memory 220, in other embodiments, multiple instruction storage regions and multiple error storage regions may be employed. In various embodiments, instruction storage 224 and error storage 228 may be implemented using static random-access memory (SRAM) data storage cells, flip-flop storage circuits, latch circuits, or any other suitable storage circuit. In some implementations, instruction storage 224 and error storage 228 may be implemented using different memory technologies. For example, memory cells or error buffers in error storage 228 may be implemented using flip-flops, while other memory cells in the instruction memory (e.g., instruction storage 224) may be implemented using SRAMs. It is noted that in some embodiments, error storage 228 may be dedicated for storing corrected versions of instructions, while in other embodiments, error storage 228 may be used to store other information.

Memory control circuit 210 includes error detection and correction circuit 214. In various embodiments, memory control circuit 210 is configured, in response to instruction fetch 104, to retrieve a particular instruction from the instruction memory 220. Error detection and correction 214 is configured to detect a data integrity error in the particular instruction, and, if the particular instruction does contain an error, to correct and store the particular instruction in error storage 228. Memory control circuit 210 is further configured, in response to receiving a subsequent request to retrieve the particular instruction on instruction fetch 104, to provide the corrected version of the particular instruction from error storage 228.

In various embodiments, memory control circuit 210 may be implemented as a controller, state machine, or other suitable sequential logic circuit. In some cases, error detection and correction 214 may be implemented as a separate dedicated state machine or sequential logic circuit. Although memory control circuit 210 is depicted as including a single dedicated logic circuit, i.e., error detection and correction 214, in other embodiments, memory control circuit 210 may include other suitable dedicated logic circuits, as will be shown below with reference to FIG. 5.

Turning now to FIG. 3, a pipeline diagram illustrating the timing of an embodiment of an execution pipeline is depicted. Execution pipeline 300 corresponds to execution pipeline 130 depicted in FIG. 1. As shown, instruction execution proceeds from top to bottom in a nine-stage pipeline, and each row of FIG. 3 represents one execution cycle.

As illustrated, execution pipeline 300 begins with fetch circuit 310, which, in this embodiment, includes fetch stages 312A and 312B. Accordingly, the operation of fetch circuit 310 is split across two cycles, during which instruction memory access occurs (e.g., to a cache, a local memory, a system memory, and the like) and fetch buffers containing unaligned fetch results are populated. A stall may occur at the fetch stage 312A stage in the event of a cache miss or line fill condition. The use of fetch stages 312A and 312B permits both portions of an instruction that crosses a cache line boundary to be retrieved. Operation of align circuit 320 occurs in align stage 322. A stall may occur here in certain cases of misalignment. For example, if multiple fetch buffers need to be scanned to identify instructions to be decoded, a stall may be necessary.

Decode circuit 330 includes decode stage 332. In one embodiment, decode circuit 330 attempts to identify up to two instructions that can be issued together for execution, subject to dependencies, although other embodiments may attempt to identify greater degrees of concurrency. Stalls may occur at the decode stage 332 based on dependencies, instruction synchronization requirements, or other factors.

Following decode stage 332, processing depends upon which circuit an instruction is routed to. Some of these circuits are referred to as "sub-pipelines." (Sub-pipelines may sometimes also be referred to as "execution pipelines," but are given a different nomenclature in this disclosure to distinguish from the larger execution pipeline 300.) Thus, load-store sub-pipeline 342 is configured to perform load-store-type instructions, while FX sub-pipelines 344A and 344B are configured to perform are a variety of logical operations, including those that perform certain fixed-point arithmetic operations. Multiply sub-pipeline 346, in contrast, performs floating-point multiply operations. A non-pipelined divider circuit 348 is also shown in this embodiment.

Instructions destined for sub-pipelines 344A/344B enter the EX1 stage 354A/355A of the respective sub-pipeline. In one embodiment, execution sub-pipelines 344 may each include two arithmetic logic units (ALUs), one of which executes at EX1 stage 354A/355A, and the other of which executes at the EX4 stage 354D/355D. As can be seen relative to the other execution sub-pipelines, including an ALU at EX4 stage 354D/355D may enable forwarding of results from other execution sub-pipelines, and may prevent some instances of dependency-related stalls.

In the depicted embodiment, instruction commit decisions occur during EX4 stage 354D, also referred to as commit stage 360. For example, by the end of EX4 stage 354D, all speculative conditions that would prevent an instruction result from properly being committed to architectural state (such as branch mispredictions, exceptions, interrupts, or similar conditions) should be resolved. In this stage, either an invalid state will be flushed or the instruction currently at EX4 stage 354D/355D will be permitted to modify architectural state at EX5 stage 354E/355E, also referred to as the writeback stage. As used herein, an "architectural state" refers to logic states of architected registers of the processor, including registers such as condition code and other status registers, as well as register files for storing instruction operands and results.

Load and store instructions, in some embodiments, may enter DC1 stage 352A of load-store sub-pipeline 342 and proceed to perform address generation and data lookup. In some implementations, loads and stores are effectively complete at DC3 stage 352C and can be forwarded, although they still need to proceed to the commit and writeback stages before they can be allowed to persistently modify architectural state.

Multiply instructions enter M1 stage 356A of multiply sub-pipeline 346. As shown, multiply pipeline 346 has similar timing to the load-store sub-pipeline 342, with results available for forwarding at M3 stage 356C. Like load and store instructions, however, multiply instructions may, in some embodiments, proceed to the commit and writeback stages prior to persistently modifying architectural state.

Divide instructions may be issued from decode circuit 330 to non-pipelined divider circuit 348. In the illustrated embodiment, divide operations are long-latency, unpipelined operations. For completeness, the divider path is shown in FIG. 3 as an issue path alongside the remaining execution sub-pipelines.

Execution pipeline 300 depicted in FIG. 3 is merely an example. Any suitable execution pipeline may be used to receive corrected instructions from instruction storage circuits as described in the present disclosure. Different numbers of pipeline stages and/or execution sub-pipelines may be included in other embodiments. For example, a multiply-and-accumulate sub-pipeline may be included in place of, or in addition to, multiply sub-pipeline 346.

Figure 4:
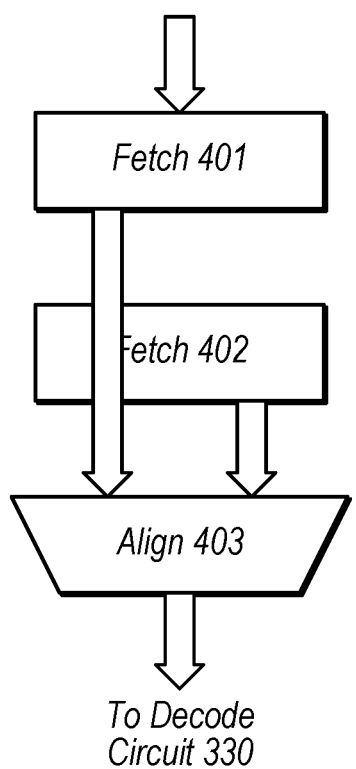
FIG. 4 is a block diagram of one embodiment of the fetch and align stages of the execution pipeline depicted in FIG. 3.

Turning now to FIG. 4, a block diagram of one embodiment of the fetch and align stages of the execution pipeline depicted in FIG. 3 is illustrated. The illustrated embodiment includes include fetch 401, fetch 402, and align 403. In various embodiments, fetch 401 and fetch 402 may correspond to fetch stages 312A and 312B, and align 403 may correspond to align circuit 320 as depicted in FIG. 3.

Fetch 401 is configured to retrieve a first portion of an instruction from a memory circuit such as instruction storage 224 during a first cycle. To retrieve the first portion of the instruction, fetch 401 may be further configured to generate one or more control signals that are sent to the memory circuit along with an address corresponding to the first portion of the instruction. The memory circuit, upon receiving the address and the control signals, transmits data indicative of the first portion of the instruction to fetch 401. In various embodiments, fetch 401 may include a buffer circuit (not shown) configured to store the data indicative of the first portion of the instruction until a second portion of the instruction has been fetched and the instruction is ready to be aligned. It is noted that in some embodiments, fetch 401 may fetch a first portion of another instruction, while fetch 402 is fetching a second portion of the instruction.

Fetch 402 is configured to retrieve the second portion of the instruction from the memory circuit during a second cycle. In some embodiments, the second cycle may directly follow the first cycle, while in other embodiments, one or more additional cycles may exist between the first cycle and the second cycle. Like fetch 401, fetch 402 may be configured to generate one or more control signals that are send with an address corresponding to the second portion of the instruction. The memory circuit, upon receiving the address and the control signals, transmits data indicative of the first portion of the instruction to fetch 401. In various embodiments, fetch 402 may include a buffer circuit (not shown) configured to store the data indicative of the first portion of the instruction until a second portion of the instruction has been fetched and the instruction is ready to be aligned.

Both fetch 401 and 402 may be implemented as controller, state machines, or other sequential logic circuits, and may include the buffer circuits described above. Although only two fetch circuits are depicted in the embodiment of FIG. 4, in cases where a fetch is split across more than two cycles, additional fetch circuits may be employed.

Align 403 is configured to combine the first portion of the instruction and the second portion of the instruction to form the complete instruction. In various embodiments, align 403 is configured to wait until both fetch 401 and fetch 402 have received their respective portions before combining the two portions into the complete instruction. As noted above, in some cases additional fetch circuits may be employed. In such cases, align 403 is configured to combine respective portions from the multiple fetch circuits to generate the complete instruction. It is noted, that the align 403 may re-order the portions of the instructions during the alignment operation in cases where the instruction portions were fetched out of sequence.

In various embodiments, align 403 may include multiple registers or other storage circuits (not shown). For example, one register may be coupled to fetch 401, while another register may be coupled to fetch 402. Respective outputs of the both registers may be coupled to a common bus that is coupled to another stage in execution pipeline 130, such as decode circuit 330.

Figure 5:
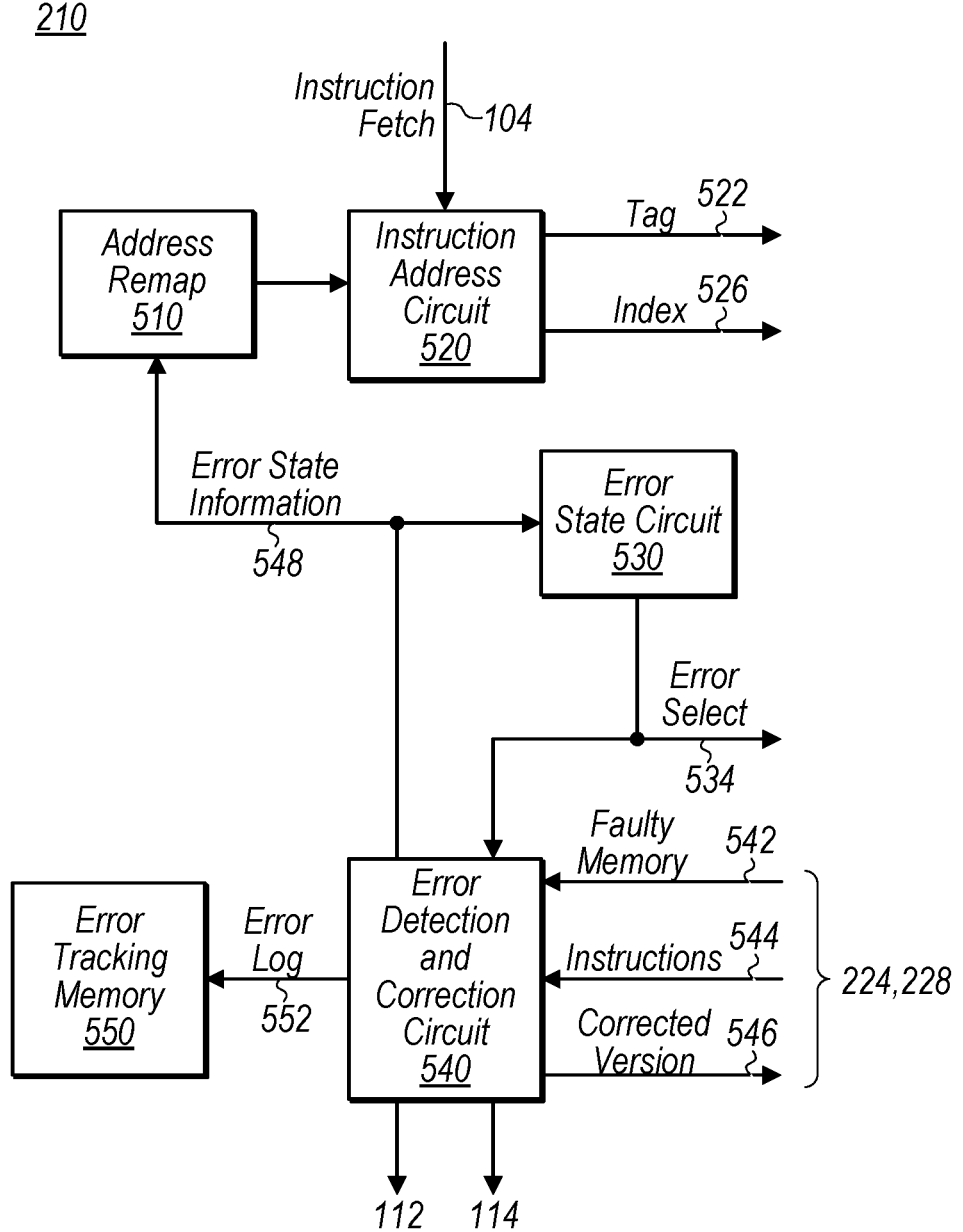
FIG. 5 is a block diagram of one embodiment of a memory control circuit within an instruction storage circuit.

Turning now to FIG. 5, a block diagram of one embodiment of a memory control circuit within an instruction storage circuit is illustrated. Generally speaking, the memory control circuit is the portion of the instruction storage circuit that handles various control functions that supplement the actual storage of instructions that is performed by instruction memory 220. In some implementations, the memory control circuit may be made up of multiple circuits. For example, an error detection and correction circuit may be located within instruction memory 220 in some embodiments.

FIG. 5 presents a logical view of various functions that may be performed by memory control circuit 210. These functions are represented by the following circuits: address remap circuit 510, instruction address circuit 520, error state circuit 530, error detection and correction circuit 540. In some embodiments, various ones of these circuits may be combined, but they are shown separately here for ease of explanation. The operation of memory control circuit 210 is first described for errors that are correctable by circuit 540. This description proceeds in two parts: operation on initial fetch of a particular instruction, and then operation on refetch of the particular instruction after detection of an error and a pipeline flush. Subsequently, a brief description of the way in which circuit 540 handles uncorrectable errors is given.

Initial Fetch

As depicted, instruction address circuit 520 receives instruction fetch 104 to access a particular instruction, and in turn generates index 526 and tag 522 that are presented to instruction memory 220. As described in FIGS. 7A-C, in some embodiments, instruction storage 224 includes set-associative memory, meaning that a particular value of index 526 may simultaneously access multiple ways; tag 522 is used to determine whether any of these ways match for the instruction access. In some implementations, index 526 and tag 522 may be stored in error state circuit 530 until it is determined whether the instruction access having this tag/index combination generated a data integrity error.

In response to the instruction access by instruction address circuit 520, instruction memory 220 returns instructions 544 to error detection and correction circuit 540. Circuit 540 has circuitry that is configured to correct and detect certain errors in instructions 544. For example, circuit 540 may correct single-bit errors but not multi-bit errors. One possible implementation of circuit 540, in which an ECC technique is used, is described with respect to FIG. 8 below.

If a correctable error is detected, circuit 540 will output instructions 544 to execution pipeline 130 as instructions 114. Correctable error signal 112 is also sent to trap logic unit 120, which indicates to perform a pipeline flush and to refetch the uncompleted instructions.

In response to error detection, circuit 540 may also begin to compute corrected version 546 of the instruction. This may take multiple cycles in some embodiments, and need only be performed in sufficient time to write corrected version 546 back to error storage 228 prior to a refetch of the error-generating instruction. As described below, upon refetch of the error-generating instruction, instruction memory 220 is configured to return the version of the instruction stored in error storage 228 rather than the version stored in instruction storage 224, since instruction storage 224 may have a persistent error. This paradigm helps ensure forward progress of the processor. In some embodiments, corrected version 546 may also be written back to instruction storage 224 upon an error detection. This approach allows processor 100 to subsequently determine if instruction storage 224 has a persistent error.

When circuit 540 detects an error, it may also generate error state information 548 that is sent to error state circuit 530. As described with respect to FIG. 6, information 548 may be used to save addressing information associated with the error-generating instruction. For example, information 548 may signal to error state circuit 530 to save an instruction address associated with the error. In some cases, this information may include index 526 and tag 522, which may correspond to the current program counter or some other value that is measured relative to the current program counter.

In some embodiments, circuit 540 may have the capability to maintain an error tracking log that allows user visibility to data integrity errors that are encountered in fetching instructions. Accordingly, circuit 540 may, upon detecting an error, write information to error tracking memory 550. The purpose of error tracking memory 550, in contrast to error storage 228, is to persistently retain a record of any data integrity errors that are encountered when fetching instructions from instruction storage 224. Accordingly, even if such errors are corrected by the disclosed techniques, instruction storage circuit 110 can provide a means to track whether errors are being encountered during instruction fetching. Error log information 552 written to error tracking memory 550 may include any pertinent information, including a time indication of the error, the address of the error-generating instruction, the location in instruction storage 224, etc. Memory 550 may be accessible in some implementations through a debug interface of processor 100 (not shown). Thus, in some embodiments, memory control circuit 210 may be configured to track data integrity errors in instructions in the instruction storage circuit over time by storing a record of their occurrence in error tracking memory 550.

On the other hand, if no error is detected in instructions 544, circuit 540 will output instructions 544 as instructions 114 to execution pipeline 130. In such a case, correctable error signal 112 will not be asserted, meaning that execution pipeline 130 will continuing fetching instructions without a pipeline flush. Furthermore, error state information 548 and error log information 552 will not be asserted.

Refetch after Pipeline Flush

As just described, in response to the initial fetch of an instruction in which a correctable error is detected, a number of different events may occur. For example, correctable error signal 112 may indicate to trap logic unit 120 to flush the pipeline and refetch instructions that are not yet complete. The error may also be corrected as corrected version 546 and written back to error storage 228, and optionally to instruction storage 224 as well. Additionally, some indication of the instruction that generated the error may be stored in error state circuit 530.

After a correctable error is detected, execution pipeline 130 will begin to refetch the flushed instructions. Eventually, the instruction the error-generating instruction will be refetched and presented as an access to instruction storage 224 using index 526 and tag 522. If this or similar addressing information matches information stored in error state circuit 530, this indicates that the error-generating instruction is being refetched, error state circuit 530 will assert error select 534. As will be described with respect to FIG. 7C, error select 534 causes corrected version 546 that is stored in error storage 228 to be provided to circuit 540 as instructions 544.

Accordingly, in the depicted embodiment, as a result of the refetch of the error-generating instruction, circuit 540 receives error select 534, instructions 544, and faulty memory indication 542. As noted, error select 534 indicates that instructions 544 corresponds to a refetch of the error-generating instruction. When error select 534 and faulty memory indication 542 are both asserted, circuit 540 may generate a value (e.g., on error state information 548) that causes address remap circuit 510 to mark the location as faulty. On the other hand, when error select 534 is asserted but faulty memory indication 542 is de-asserted, no indication of a faulty memory location is sent to address remap circuit 510. If there is no error detected for refetched instructions 544 (and error checking could be disabled when error select 534 is asserted in some embodiments), circuit 540 will output instructions 544 to execution pipeline as instructions 114.

FIG. 5 thus discloses a memory control circuit that is configured to store the corrected version of a particular instruction to a corresponding location in the instruction memory in addition to storing the corrected version in the error storage circuit. The memory control circuit is further configured, in response to a subsequent request to retrieve the particular instruction, to determine that a corrected version of the particular instruction has been stored in the error storage circuit. and to provide the corrected version of the particular instruction from the error storage circuit to one or more pipeline stages in the execution pipeline. The memory control circuit may further be configured, in response to the subsequent request to retrieve the particular instruction, to retrieve the corrected version from the corresponding location in the instruction memory. If the corrected version still has a data integrity error, the memory control circuit may be configured to mark the corresponding location in the instruction memory as faulty.

Stated another way, instruction storage circuit 110, in addition to storing a corrected version of an error-generating instruction in a redundant portion of the instruction memory, may also be configured to store the corrected version in a storage location of a non-redundant portion of the instruction memory. Accordingly, in response to a re-request for the error-generating instruction, the instruction storage circuit may be configured to compare the corrected version stored in the non-redundant and redundant portions of the instruction memory to determine if there is a persistent error in the non-redundant portion of the instruction memory. If the instruction storage determines that there is a persistent error in the non-redundant portion of the instruction memory, the instruction storage circuit may be configured to store an indication that a subsequent request to the storage location is to be remapped to a different storage location.

Uncorrectable Error Handling

In some cases, instructions 544 may include an uncorrectable error (also referred to as a non-correctable error). For example, circuit 540 may be configured to correct single-bit errors but not multi-bit errors. If an error is not correctable by circuit 540 for a particular instruction, corrected version 546 will not be generated. Instead, instructions 544 may be provided to execution pipeline 130 as instructions 114, along with appropriate error status. This error status may, at a later stage in the pipeline, cause a particular type of fault to be taken. For example, an instruction access fault may be generated for the instruction in response to a multi-bit error. Such a fault may be handled by fetching the instruction from a higher level of the memory hierarchy. If the instruction is stored correctly at this higher level of memory, the program can proceed accordingly.

In some embodiments, an indication of an uncorrectable error may also cause other actions to be taken. For example, error detection and correction circuit 540 may store an indication of the error to error tracking memory 550. As will be described below with reference to FIG. 8, in some implementations, circuit 540 may send information to address remap circuit 510 in order to mark the corresponding location as faulty.

Accordingly, a processor having the memory control circuit of FIG. 5 can be configured to differentiate between a single-bit and multi-bit error in various embodiments. Thus, in response to detecting a multi-bit error in a given instruction in the instruction memory, the instruction storage circuit is configured to send an indication of the multi-bit error to the execution pipeline along with the given instruction, without correcting the multi-bit error. In response, the trap logic unit may be configured to take an instruction access fault on the given instruction in response to receiving the indication of the multi-bit error. The trap logic unit may, in some embodiments, handle the instruction access fault by retrieving the given instruction from a higher-level memory.

Stated in similar fashion, the memory control circuit, in response to detecting that a given instruction has a data integrity error that is a multi-bit error, may be configured to retrieve, from a higher-level memory than the instruction memory, a cache line that includes the given instruction, write the different instruction from the retrieved cache line to an error buffer circuit, and write the cache line to an instruction storage in the instruction memory. Further, the memory control circuit, in response to a refetch of the given instruction, may be configured to cause the given instruction to be provided to the execution pipeline from the error buffer circuit, and check whether a version of the given instruction stored in the instruction storage matches a version of the given instruction stored in the error buffer circuit.

Figure 6:
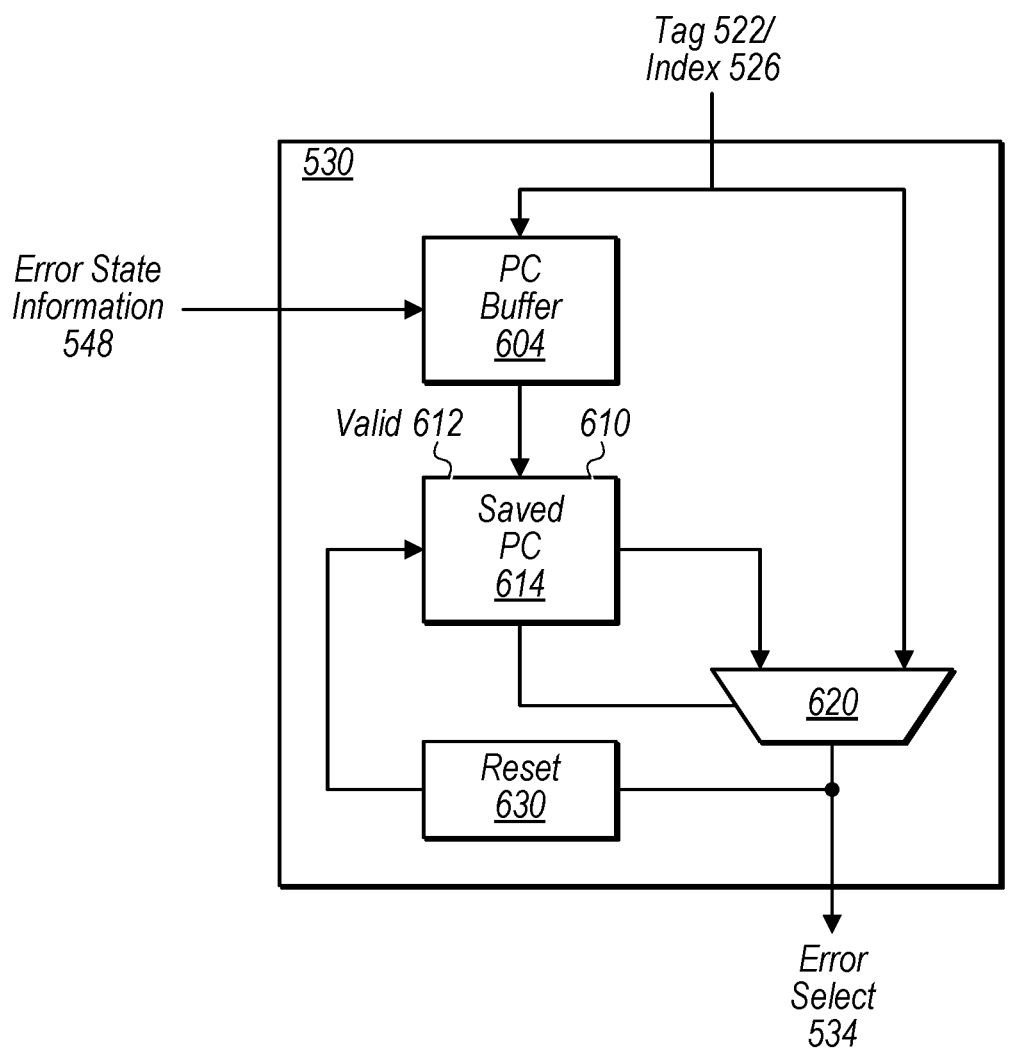
FIG. 6 is a block diagram of one embodiment of an error state circuit configured to preserve state information associated with detection of an instruction error.

Turning now to FIG. 6, a block diagram of one embodiment of an error state circuit is illustrated. As depicted, error state circuit 530 includes a program counter (PC) buffer 604, error state storage 610, comparator 620, and reset circuit 630. In the embodiment shown, circuit 530 receives tag 522, index 526, error state information 548 as inputs, and outputs error select 534.

Broadly speaking, the purpose of error state circuit 530 is to store state information indicative of the error-generating instruction. For example, this state information can be the address, or PC, of the error-generating instruction. This address can be used to recognize that the error-generating instruction is being refetched, and thus assert error select 534. This assertion causes instruction memory 220 to supply the instruction from error storage 228.

As instruction memory 220 is addressed using tag 522 and index 526 for successive accesses, these values may be stored to PC buffer 604. The purpose of PC buffer 604 is to store address information for a given instruction until it is determined by error detection and correction circuit 540 that the given instruction does not have an error.

As an example, suppose tag 522 and index 526 for a given instruction are written to a first position in PC buffer 604 during a first cycle. During this cycle, tag 522 and index 526 may also be presented to instruction storage 224. In a second, successive clock cycle, the given instruction may be written to a next position in PC buffer 604, while instructions 544 are returned from instruction storage 224 to circuit 540. In a third, successive cycle, the given instruction may be written to a last position in PC buffer 604 while circuit 540 determines whether there is an error in instructions 544 and asserts or de-asserts error state information 548. In a fourth, successive cycle, PC buffer 604 performs one of two actions depending on the value of error state information 548 determined in the previous cycle. If 548 is de-asserted (meaning there is not an error), the given instruction is overwritten in PC buffer 604 by the next instruction in line. There is no need to retain this instruction in this scenario because it has been determined to be error-free. But if 548 is asserted (meaning there is an error), error state circuit 530 does retain address information for the error-generating instruction. To this end, PC buffer 604 may write the tag and index for the given instruction residing in the last buffer position to error state storage 610. In one embodiment, this operation involves storing the tag and index as saved PC 614 and setting valid bit 612.

As noted, a determination of an instruction error by circuit 540 will cause a flush of execution pipeline 130, followed by refetching of instructions that have not yet completed. As these instructions are refetched, tag 522 and index 526 will act as one input to comparator 620, while saved PC 614 acts as the other input. Note that, in this embodiment, comparator 620 operates only when valid bit 612 is asserted, because otherwise there is no need to perform the comparison.

As long as there is not a match between the inputs of comparator 620, error select 534 remains de-asserted. But when the tag 522/index 526 match saved PC 614, this indicates that the error-generating instruction is being refetched. Accordingly, error select 534 is asserted. As noted, this signal is used to cause an instruction fetch result to be supplied from error storage 228 to ensure forward progress. Once error select 534 is asserted, there is no longer be a need to perform this address comparison. As such, reset circuit 630 may cause error state storage 610 to be cleared. This will reset valid bit 612, which will mean that comparator 620 is no longer selected until a subsequent error is detected.

In some implementations, in order to help guarantee forward progress, only one error can be handled at a time. Accordingly, error state circuit 530 may be implemented such that when error state storage 610 is written, PC buffer 604 is temporarily disabled. As will be described with respect to FIG. 9, it may be the case that after the error-generating instruction is refetched and successfully completes, trap logic unit 120 causes another pipeline flush to occur, such that instructions are refetched beginning at the next PC value after the error-generating instruction. At that point, circuit 530 can again resume operation by storing address information in PC buffer 604.

Figure 7A:
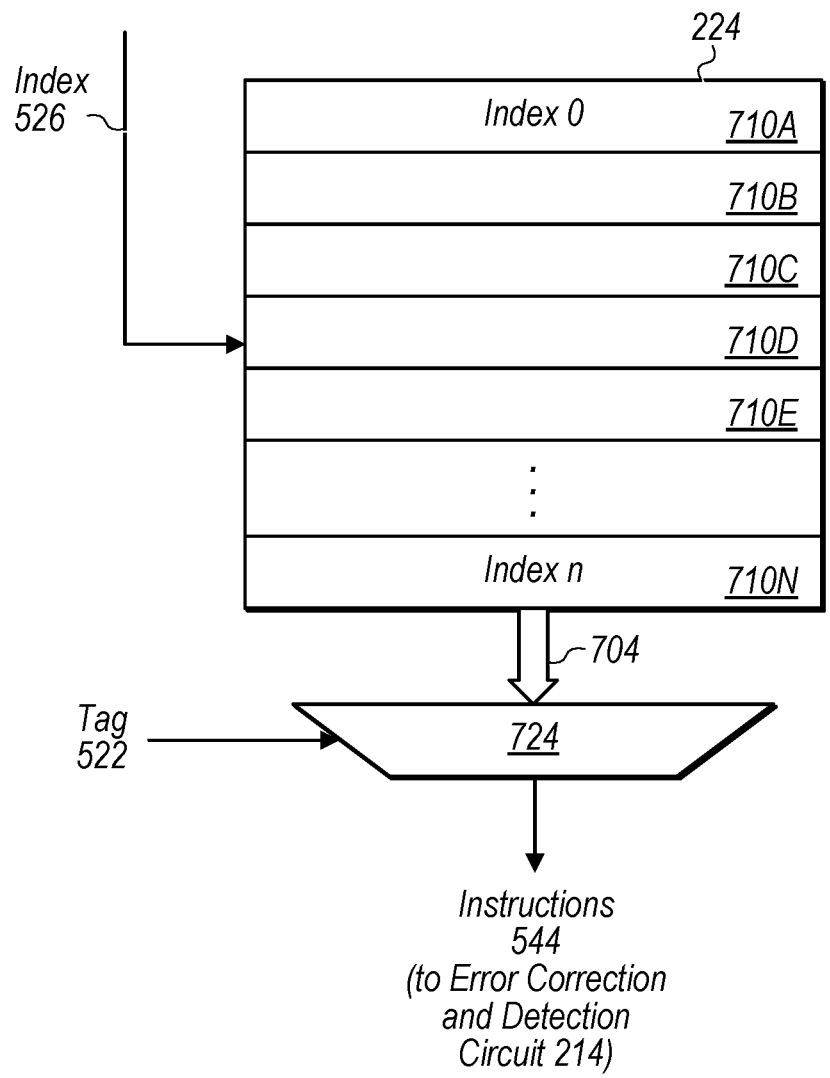
FIG. 7A is a block diagram of one embodiment of an instruction storage configured to store instructions for a processor.

Turning now to FIG. 7A, a block diagram of one embodiment of instruction storage 224 is illustrated. As depicted, instruction storage 224 includes a number of entries, indicated as 710A-N, corresponding to indexes 0-n, respectively. Sample fields within entries 710 are discussed next with reference to FIG. 7B. Instruction storage 224 may be accessed by providing index 526 and tag 522 as inputs, which in turn generates output 704. In one embodiment, output 704 may include one or more sets of tags and instructions within an entry selected by index 526. If instruction storage 224 is set associative, output 704 will include multiple sets of tags and instructions. Accordingly, if tag 522 matches any of the tags within output 704, the corresponding instructions will be output as instructions 544 to error detection and correction circuit 214. If none of the tags match, instruction storage 224 may indicate a cache miss, which will cause a fetch of the instruction from a higher level of the memory hierarchy. Thus, if instruction storage 224 is an L0 cache in one embodiment, a cache miss may refill the instruction from an L1 or L2 cache.

Figure 7B:
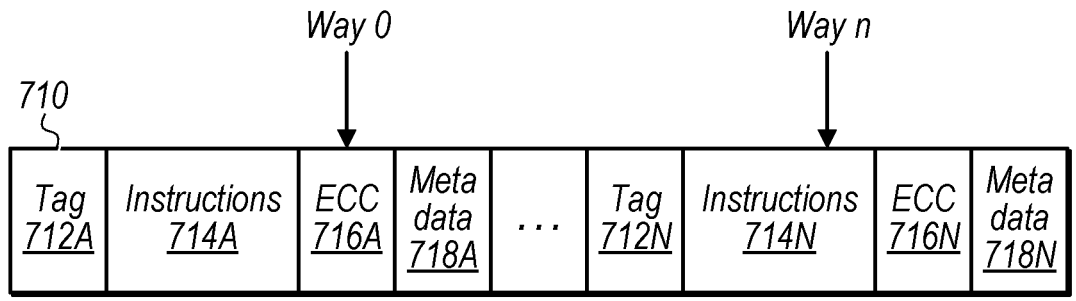
FIG. 7B is a block diagram illustrating fields in one embodiment of an entry of the instruction storage depicted in FIG. 7A.

Turning now to FIG. 7B, a block diagram of one embodiment of an entry 710 of instruction storage 224 is illustrated. Entry 710 in FIG. 7B is representative of each of entries 710 shown in FIG. 7A. In the illustrated embodiment, instruction storage 224 is set associative, and thus includes ways 0-n, each of which includes a tag 712, instructions 714, ECC 716, and metadata 718. For each way, tag 712 and instruction 714 are included as part of output 704 in FIG. 7A; tag 522 can be used to determine whether there is a match with a particular way of the entry corresponding to index 526. To facilitate error detection, ECC 716 (or parity bits in some embodiments) may also be included in output 704, such that ECC 716 for the selected way are included as part of instructions 544 that are sent to error detection and correction circuit 214. Finally, in some embodiments, metadata 718 can be used for a variety of purposes, including cache status.

Figure 7C:
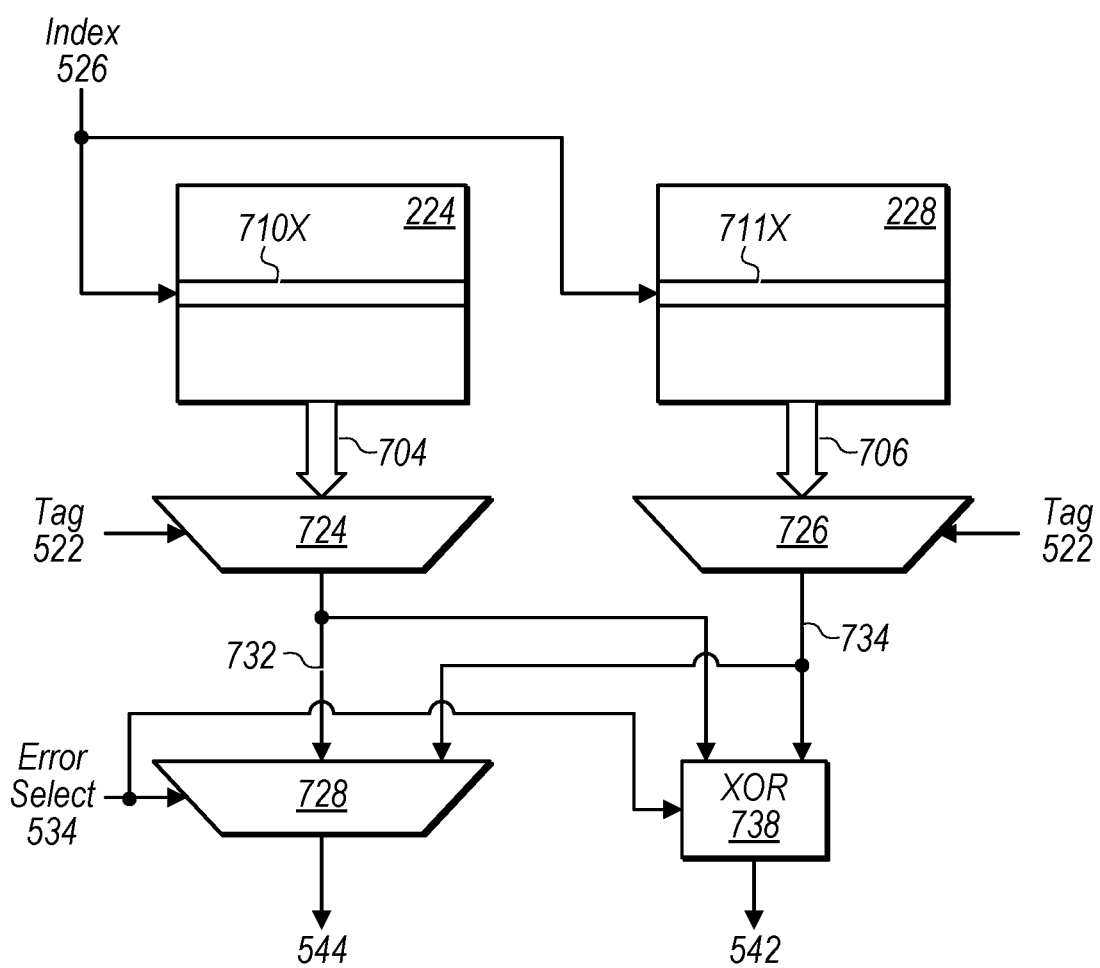
FIG. 7C is a block diagram of one embodiment of the use of an error select signal to select between providing instructions from an instruction storage or an error storage within an instruction memory.

Turning now to FIG. 7C, a block diagram of one embodiment of the use of an error select signal to select an instruction from an instruction memory is illustrated. As shown, instruction memory 220 includes instruction storage 224, error storage 228, multiplexers 724, 726, and 728, as well as XOR circuit 738. Outputs of instruction memory 220 include instructions 544 and faulty memory indication 542. The operation of instruction storage 224, including the use of index 526 and tag 522, entries 710, output 704, and multiplexer 724, has previously been described with respect to FIG. 7A.

Error storage 228, in one embodiment, may be organized similarly to instruction storage 224; entries in error storage 228 are indicated by reference numeral 711. In the depicted embodiment, error storage 228 is not set associative and stores one set of instructions per entry 711. As can be seen, instruction storage 224 and 228 may be accessed in parallel using index 526 and tag 522. Instruction storage 224 provides output 704, while error storage 228 provides output 706, which may be similar in content to output 704. Multiplexer 724 outputs instructions 732 if there is a match between tag 522 and one of the tags 712 in the entry in instruction storage 224 selected by index 526. Similarly, multiplexer 726 outputs instructions 734 if there is a match between tag 522 and the tag in entry in error storage 228 that is selected by index 526.

In the depicted embodiment, instructions 732 and 734 are both provided to multiplexer 728. As previously discussed, error select 534 is asserted if the current instruction memory access corresponds to a refetch of an error-generating instruction. As such, when error select 534 is asserted, instruction memory 220 will select the output from error storage 228 that cycle, meaning that multiplexer 728 will output instructions 734 as instructions 544 to error detection and correction circuit 540.

In some embodiments, instruction storage circuit 110 may not only provide instructions from error storage 228 on a refetch, but also may recheck whether the data integrity error persists in the original location in instruction storage 224 that caused the error. As previously described, error detection and correction circuit 540 may have written corrected version 546 of the instruction to both instruction storage 224 and error storage 228. While instruction memory 220, in this embodiment, will supply instructions 734 to error detection and correction circuit 540 to permit forward progress of the executing program, instruction memory 220 may also check the contents of instruction storage 224. In the illustrated embodiment, this is performed by XOR circuit 738, which compares instructions 732 and 734 to determine if any differences exist. If there are differences, faulty memory indication 542 is asserted. Instructions 734 is presumed to have no errors, and thus XOR circuit 738 indicating that the copy of the instruction in instruction storage 224 is the same as the copy in error storage 228 may be a sufficient indication that the error is not persistent. Alternatives to an XOR circuit may be employed to recheck instruction storage 224 in some embodiments. In any event, results of this comparison may be communicated to error detection and correction circuit 540. As noted with respect to FIG. 5, an indication of a faulty storage location may cause that location to be "remapped," meaning that location will not be used by instruction memory 220 going forward.

FIG. 7C shows a particular implementation of error storage 228 in which this storage element is addressed in parallel with instruction storage 224. In this embodiment, error storage 228 may include many different entries 711, only one of which is used at a given time. In some implementations, instruction memory 220 could be composed of a plurality of memory banks, in which banks making up instruction storage 224 are "non-redundant" portions of instruction memory 220, and in which one or more banks making up error storage 228 are "redundant" portions of instruction memory 220.

Figure 7D:
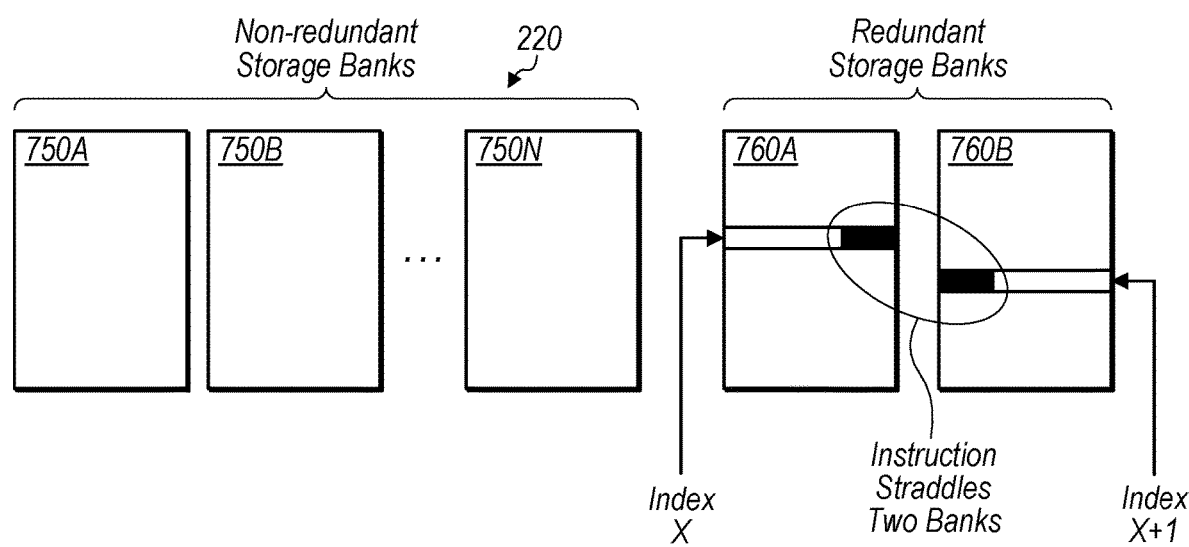
FIG. 7D is a block diagram of one implementation of an instruction memory that uses two redundant banks to store an instruction that straddles two instruction entries.

Turning now to FIG. 7D, a block diagram of another embodiment of instruction memory 220 is illustrated. This embodiment includes non-redundant storage banks 750, and redundant storage banks 760. This embodiment contemplates that a given instruction may straddle or span entries from two entries in instruction storage 224. Thus, in a first fetch cycle (e.g., F1 pipeline stage), index x might be accessed, while in a second fetch cycle (e.g., F2 pipeline stage), index x+1 might be accessed. As illustrated in FIG. 4, the two different portions of the instruction may be aligned in an aligner stage of the pipeline.

As such, error storage 228 may be organized to accommodate an instruction that straddles multiple instruction entries. Thus, as depicted, the redundant portion of instruction memory 220 includes two memory banks, 760A and 760B, that are configured to store an instruction that straddles memory banks. Banks 760 may be accessed in consecutive cycles in some embodiments.

Note that error storage 228 need not be implemented as an entire memory bank in some embodiments. Error storage 228 could also be implemented using a single error buffer circuit or register, or alternately as first and second error buffers/registers to accommodate a particular instruction spanning two entries. Thus, where a particular instruction spans two of multiple memory banks in the instruction storage circuit, the memory control circuit may be configured to store the corrected version of the particular instruction using portions of the first and second error buffers circuits.

In sum, instruction storage 224 and error storage 228 may be implemented in various ways. Regardless of how these storages are organized, when they are accessed, they may return results to error detection and correction 540. One possible implementation of circuit 540, in which an ECC technique is used, is described now with reference to FIG. 8.

Figure 8:
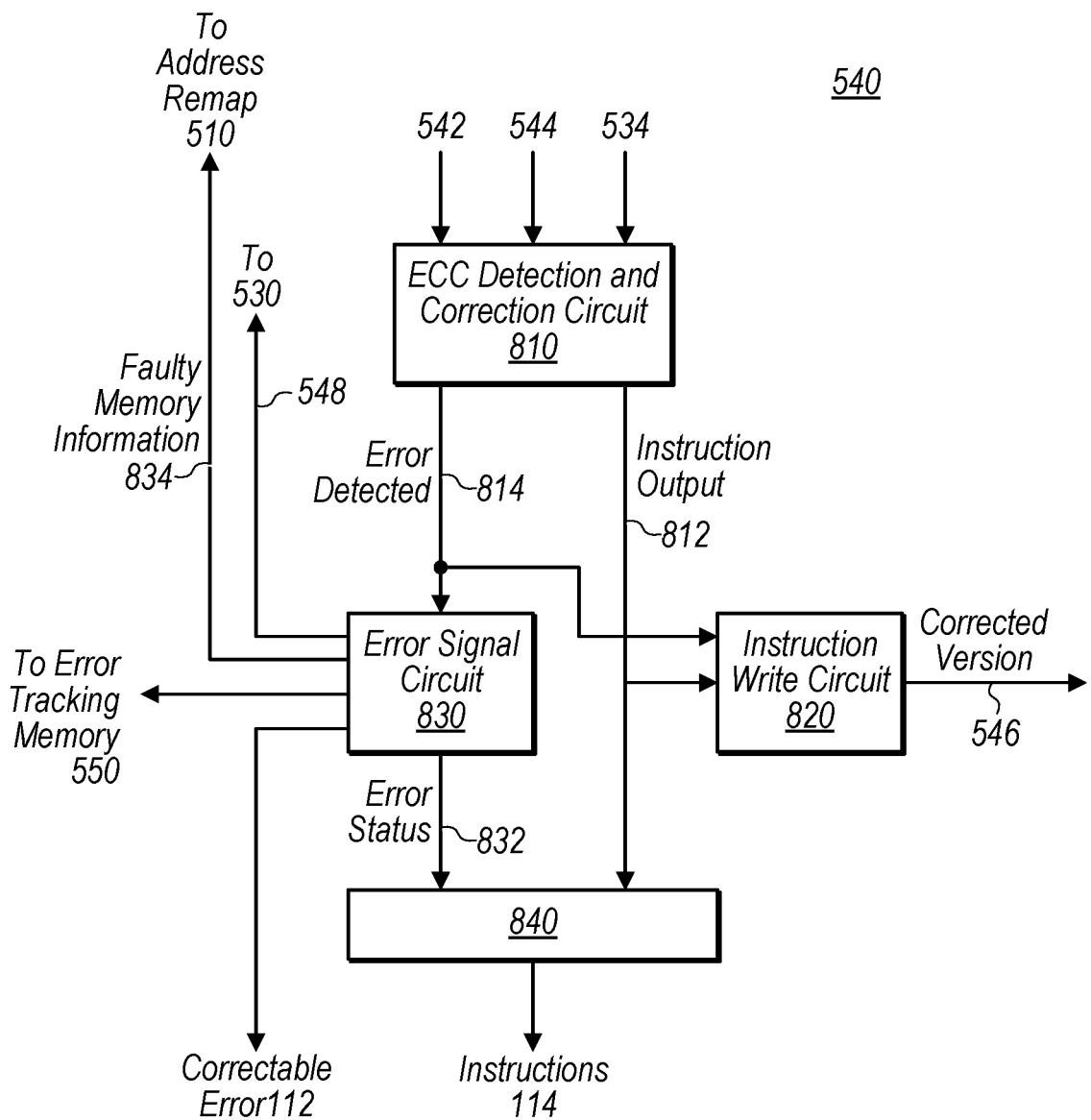
FIG. 8 is a block diagram of one embodiment of an error detection and correction circuit within a memory control circuit of the instruction storage circuit.

Turning now to FIG. 8, a block diagram of one embodiment of an error detection and correction circuit 540 is illustrated. Generally speaking, the error detection and correction circuit is the portion of the disclosed instruction storage circuit that detects errors in instructions retrieved from instruction storage 224, generates corrected versions of those instructions, and signals errors to other circuits in the processor. In various embodiments, different circuits within circuit 540 may be organized differently than shown in FIG. 8.

FIG. 8 presents a logical view of various functions that may be performed by error detection and correction circuit 540. These functions are represented by the following circuits: ECC detection and correction circuit 810, instruction write circuit 820, error signal circuit 830, and output circuit 840. In some embodiments, various ones of these circuits may be combined, but they are shown separately here for ease of explanation. As with the description of FIG. 5, operation of circuit 540 is first described for errors that are correctable by ECC detection and correction circuit 810. This description proceeds in two parts: operation on initial fetch of a particular instruction, and then operation on refetch of the particular instruction after detection of an error and a pipeline flush. Operation of circuit 540 is then described with respect to errors that are not correctable by circuit 810.

Initial Fetch

Error-correcting code (ECC) is a known error detection and correction technique that is particularly well-suited for use with memory errors. Variations of this technique may be implemented by ECC detection and correction error detection and correction circuit 810. Different levels of ECC may be employed in different embodiments. In some embodiments, only single-bit errors may be corrected by error detection and correction circuit 810, while in other embodiments, single-bit and double-bit errors may both be corrected. In a given embodiment, whatever errors circuit 540 is configured to correct are referred to as correctable errors, while those errors the circuit is not configured to correct are uncorrectable errors. Accordingly, what constitutes a correctable as opposed to a uncorrectable error may vary by implementation.

Note that although circuit 810 is shown within error detection and correction circuit 540 in the depicted embodiment, in other implementations, circuit 810 may reside within instruction memory 220.

When instruction memory 220 is accessed in response to instruction fetch request 104, if the requested instruction is found in instruction storage 224, circuit 810 receives instructions 544 as an input (faulty memory indication 542 and error select 534 are discussed in the section below pertaining to instruction refetch). Circuit 810, in response to receiving instructions 544, is configured to perform ECC detection techniques to determine whether instruction 544 includes a correctable error. If no error is detected, instruction output 812 will be the same as instructions 544, and the value of error detected signal 814 will indicate to error signal circuit 830 that no error is present. As such, signal 814 will indicate to instruction write circuit 820 that instruction output 812 need not be written back to instruction memory 220.

On the other hand, circuit 810 may detect a correctable data integrity error in instruction 544, such as a single-bit error. In this instance, memory control circuit 210 (specifically error detection and correction circuit 810), in response to the data integrity error being a single-bit error, is configured to perform an ECC-correction operation on the particular instruction to generate a corrected version of the particular instruction for storage in the error storage circuit. This may be accomplished by outputting, as instruction output 812, a corrected version of the instruction, along with a value of error detected signal 814 that indicates that a correctable error has been detected.

Instruction write circuit 820 is configured, in response to receiving an indication of a correctable error on signal 814, is configured to cause instruction output 812 to be written to instruction memory 220 as corrected version 546. Corrected version 546 is written to error storage 228, which may be implemented as one or more memory banks, an error buffer, etc. In some embodiments, corrected version 546 may also be written back to the location in instruction storage 224 that generated the error. To accomplish this, instruction write circuit 820 may in some cases temporarily assume control of the bus used to fill instruction storage 224 from a higher-level memory. The location in instruction storage 224 to which corrected version 546 is to be written may in some cases be stored in error state circuit 530.

In response to receiving a value on error detected signal 814, error signal circuit 830 may be configured to cause various other signals to be sent elsewhere within the processor. Correctable error signal 112, as previously noted, is sent to trap logic unit 120. This signal may initiate a trap handling routine that causes a pipeline flush following by a refetch of a group of instructions. This group of instructions may begin from the current program counter and thus include the error-generating instruction. In some embodiments, error status 832 may also be generated and concatenated with instruction output 812 by output circuit 840 to generate instructions 114 that are sent to execution pipeline 130. In some embodiments, error signal circuit 830 may also write an error message to error tracking memory 550.

Error signal circuit 830 may also generate error state information 548. As noted with respect to FIGS. 5-6, upon a correctable error being detected by circuit 540, error state information 548 may be used to save, in error state circuit 530, an indication of what instruction generated the error. In some cases, information 548 might include the address information itself, while in other cases, information 548 might signal circuit 530 to save a particular value of the program counter (or a value that is based on the program counter).

Refetch after Pipeline Flush

As just described, in response to the initial fetch of an instruction in which a correctable error is detected, a number of different events occur. Correctable error signal 112 indicates to trap logic unit 120 to flush the pipeline and refetch the instructions that are not yet complete. The error may also be corrected as corrected version 546 and written back to both instruction storage 224 and error storage 228. Additionally, some indication of the instruction that generated the error may be stored in error state circuit 530.

After a correctable error is detected, the execution pipeline will begin to refetch instructions that were flushed from execution pipeline 130. Eventually, the instruction that generated the error will be refetched and flagged using information stored in error state circuit 530, causing error select 534 to be asserted. As described with respect to FIG. 7C, error select 534 causes corrected version 546 stored in error storage 228 to be provided to circuit 810 as instructions 544. During this refetch, instruction memory 220 may also check to see if the error still exists in instruction storage 224, and generate faulty memory indication 542 accordingly.

Thus, as a result of the refetch of the error-generating instruction, circuit 810 receives, in one embodiment, error select 534, instructions 544, and faulty memory indication 542. As noted, error select 534 indicates that the instruction 544 corresponds to a refetch of the error-generating instruction. When error select 534 and faulty memory indication 542 are both asserted, circuit 810 may generate a value on error detected 814 that causes error signal circuit 830 to send faulty memory information signal 834 to address remap circuit 510. On the other hand, when error select 534 is asserted but faulty memory indication 542 is de-asserted, error detected signal 814 does not indicate an error, and error signal circuit 830 does not cause faulty memory information 834 to be sent to address remap circuit 510.

Assuming there is no error detected for instructions 544 (and error checking could be disabled when error select 534 is asserted in some embodiments), circuit 810 will output instruction output 812 as instructions 544. Output circuit 840 will, in turn, provide instruction output 812 to execution pipeline 130 as instructions 114.

Uncorrectable Errors

In some cases, instructions 544 may include an uncorrectable error. For example, circuit 810 may be configured to correct single-bit errors but not multi-bit errors. If an error is not correctable by circuit 810, this may be indicated by a particular error type that is sent on error indicated signal 814 to error signal circuit 830 and instruction write circuit 820. Because the error is not being corrected, instruction write circuit 820 will not generate corrected version 546. Instead, instruction output 812 will be the uncorrected version of the instruction, which may be provided to execution pipeline 130 by output circuit 840 as part of instructions 114, along with error status 832. Error status 832 may, at a later stage in the pipeline, cause trap logic unit 120 to initiate a particular type of fault. For example, an instruction access fault may be generated for an instruction having a multi-bit error. An instruction access fault may be handled by fetching the instruction from a higher level of the memory hierarchy. If the instruction is stored correctly at this higher level of memory, then the program can proceed accordingly.

In some embodiments, an indication of a non-correctable error may also cause other actions to be taken. For example, error signal circuit 830 may store an indication of the error to error tracking memory 550. In some implementations, error signal circuit 830 may send information on faulty memory information signal 834 to address remap circuit 510 in order to mark the corresponding location as faulty.

Figure 10:
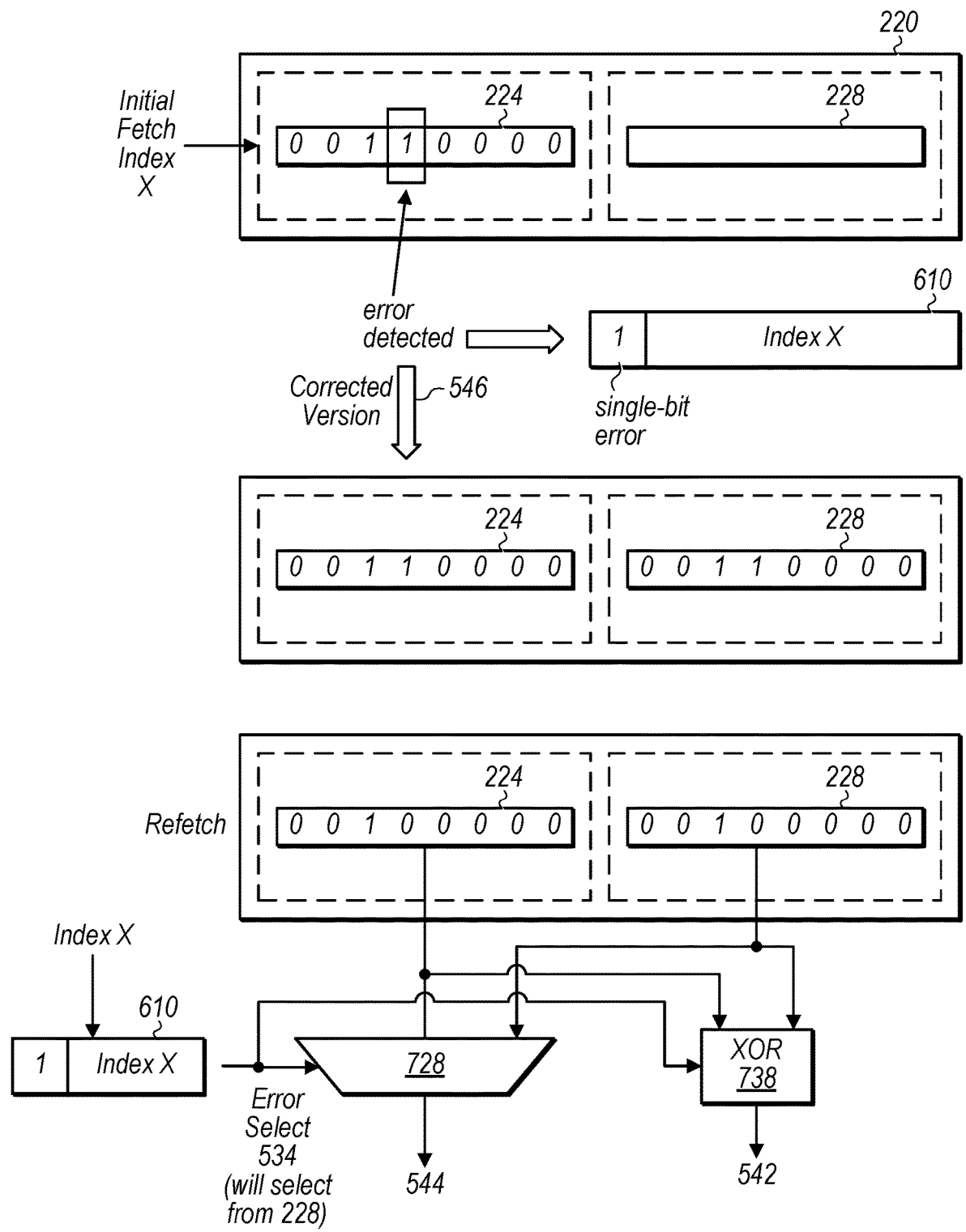
FIG. 10 depicts an example of an instruction error being detected, corrected, stored to error storage and selected from the error storage upon refetch after a pipeline flush.

As has been described with respect to FIGS. 5-8, numerous actions may occur in processor 100 during initial instruction fetch and refetch of an error-generating instruction. FIGS. 9-10 help summarize actions that may occur in some embodiments. FIG. 9 is a timing diagram that illustrates a sample of how a pipeline flush may be implemented, while FIG. 10 shows how saving state information can be utilized upon a refetch to cause an instruction to be provided to the execution pipeline from error storage 228 as opposed to instruction storage 224.

Turning now to FIG. 9, a timing diagram is shown that depicts a detection of an error in an instruction, a pipeline flush, and a refetch of the instruction. Diagram 900 is based on the example execution pipeline of FIG. 3, which includes two fetch stages (F1 and F2), an align stage, a decode stage, four execute stages, and a writeback stage. The contents of this execution pipeline are shown for 18 consecutive cycles, denoted as clock cycle 0 through clock cycle 17. In this example, there is one instruction per pipeline stage. Instructions are denoted as A-O.

During cycle 0, the execution pipeline includes instructions A-I, with oldest instruction A at the writeback stage and youngest instruction I at the fetch 1 (F1) stage. These instructions are stored in a memory such as instruction storage 224, and have been fetched from this memory and provided to the pipeline illustrated in diagram 900. In the depicted example, the version of instruction I supplied to the pipeline has a data integrity error, as indicated by the asterisk.

The data integrity error may be detected outside the pipeline in various embodiments—for example, by an storage circuit such as instruction storage circuit 110. In addition to sending the error-generating instruction I to the execution pipeline, the instruction storage circuit may also signal to another portion of the processor (such as trap logic unit 120) that a correctable error has been detected. In diagram 900, the timing is such that a pipeline flush command is received by the pipeline in cycle 2, during which instruction D is at the commit stage. (In diagram 900, the program counter (PC) points to instruction D during cycle 2.) As a result of the pipeline flush, all instructions in the pipeline that are younger than C are flushed. Instruction C, on the other hand, has its results written to the architectural state and thus completes.

With the pipeline empty after the flush, the pipeline begins refetching instruction to refill beginning in cycle 3. This refetch occurs beginning at the program counter, which corresponds to instruction D (as indicated by RFPC D shown at cycle 2 of diagram 900). Thus, in cycle 3, the F1 stage includes instruction D, while in cycle 4, the F2 stage includes instruction D and the F1 stage includes instruction E. This process continues such that in cycle 8, instruction I is refetched from the instruction storage circuit. As has been described, after initial detection of the error in instruction I, the instruction storage circuit is configured to generate a corrected version of instruction I, store it in an error storage location, and, upon a refetch of this instruction, supply the corrected version from the error storage location.

The time period for generating the corrected version of an instruction should fall within a "flush window," which refers to a number of cycles between the initial detection of an error in a particular instruction and a subsequent refetch of the particular instruction after a pipeline flush. In diagram 900, if it is assumed that the error in instruction I was detected at cycle (−1), the corrected version of instruction I needs to be ready at least by the end of cycle 7, so it can be provided to F1 in cycle 8. Thus, the flush window may be up to 8 cycles in diagram 900. The length of flush window can vary for different implementations.

Some implementations of the instruction storage circuit are set up to be able to handle only one instruction error at a time. An example of such an implementation is shown in diagram 900. As shown, instruction I is refetched such that a corrected version of this instruction is provided to F1 in cycle 8. Instruction I proceeds through the pipeline, arriving at the commit stage in cycle 15. In some embodiments, upon instruction I reaching this stage and committing, this causes another flush of the pipeline. This flush causes a refetch beginning not at the current program, but at the next program counter (NPC): instruction J. Accordingly, instruction J is refetched in cycle 16 and the pipeline refills from there.

This type of implementation is set up to maximize the possibility of forward progress of a program that includes the instructions shown in diagram 900. Thus, when an error is detected in instruction I, the pipeline will not commit any instruction beyond instruction I. When instruction I is refetched and then committed (e.g., in cycle 15 of diagram 900), then a subsequent flush causes a refetch of the next PC after instruction I. Accordingly, if instruction J also has a data integrity error, the pipeline can handle this error as it did with the error in instruction I.

Note that, in other implementations, more than one error can be handled at a time. Such implementations may not require a second pipeline flush in cycle 15, thus allowing instructions J-P to continue through the pipeline. In general, any reasonable number of errors may be handled concurrently, depending on the desired complexity/area of the circuitry to be devoted to this end.

Turning now to FIG. 10, an example illustrating how saving state information within an instruction storage circuit can be used to select a corrected version of an instruction upon refetch is depicted. FIG. 10 illustrates actions that occur on two different fetches: initial fetch 1000 of an instruction, and refetch 1050 of the same instruction. Refetch 1050 occurs after a pipeline flush caused by error in the instruction detected during initial fetch 1000. Only certain portions of the exemplary instruction storage circuit are shown for simplicity.

During initial fetch 1000, addressing information, including an index (indicated by "index x" in FIG. 10), is presented to instruction memory 220. In the depicted example, index corresponds to instruction storage location 1010, which includes the value "00110000". One of the logical-high bits in this location is erroneous, as indicated by a small rectangle drawn around this bit in FIG. 10. For purposes of this example, assume that this bit should have a logical-low value. Error storage location 1020 is currently empty, meaning that the instruction storage circuit is not currently handling another error.

FIG. 10 shows two actions that are taken in response to detecting the error in storage location 1010 (other actions that are not depicted may also occur, such as signaling the trap logic unit). First, state information may be written to error state storage 610. This state information, which may include index x, is used to save an indication of the error-generating instruction. This information may specify, in some embodiments, that the error is correctable. This is shown in FIG. 10 by a "1" stored in a field within error state storage 610.

Second, corrected version 546 of the instruction is stored to storage location 1020 in error storage 228. In embodiments such as that depicted in FIG. 10, corrected version 546 is also stored to storage location 1010 in instruction storage 224. As can be seen from FIG. 10, the corrected version is shown as "00100000".

Accordingly, as of the time of refetch 1050, storage location 1020 and possibly storage location 1010 both include corrected version 546. In response to refetch 1050, address information (which may include index x) is compared to the address information stored in error state storage 610. A match between these values causes error select 534 signal to be asserted. This signal indicates that the error-generating instruction is being refetched. As previously indicated in FIG. 7C, error select 534 causes the value in storage location 1020 to be included in instructions 544 rather than the value in storage location 1010. In FIG. 10, this is accomplished by having error select 534 act as the select signal for multiplexer 734.

Corrected version 546 may also be written back to the original storage location 1010 in addition to being written to storage location 1020. In embodiments such as the one depicted in FIG. 10, this allows the processor to recheck the contents of storage location 1010 to see if that location remains faulty. As noted, one method of doing that is to XOR the contents of storage locations 1010 and 1020. An indication of whether storage location 1010 has a persistent error can be output as faulty memory indication 542, which can be used to cause any further accesses to this location within instruction storage 224 to be remapped.

Figure 11:
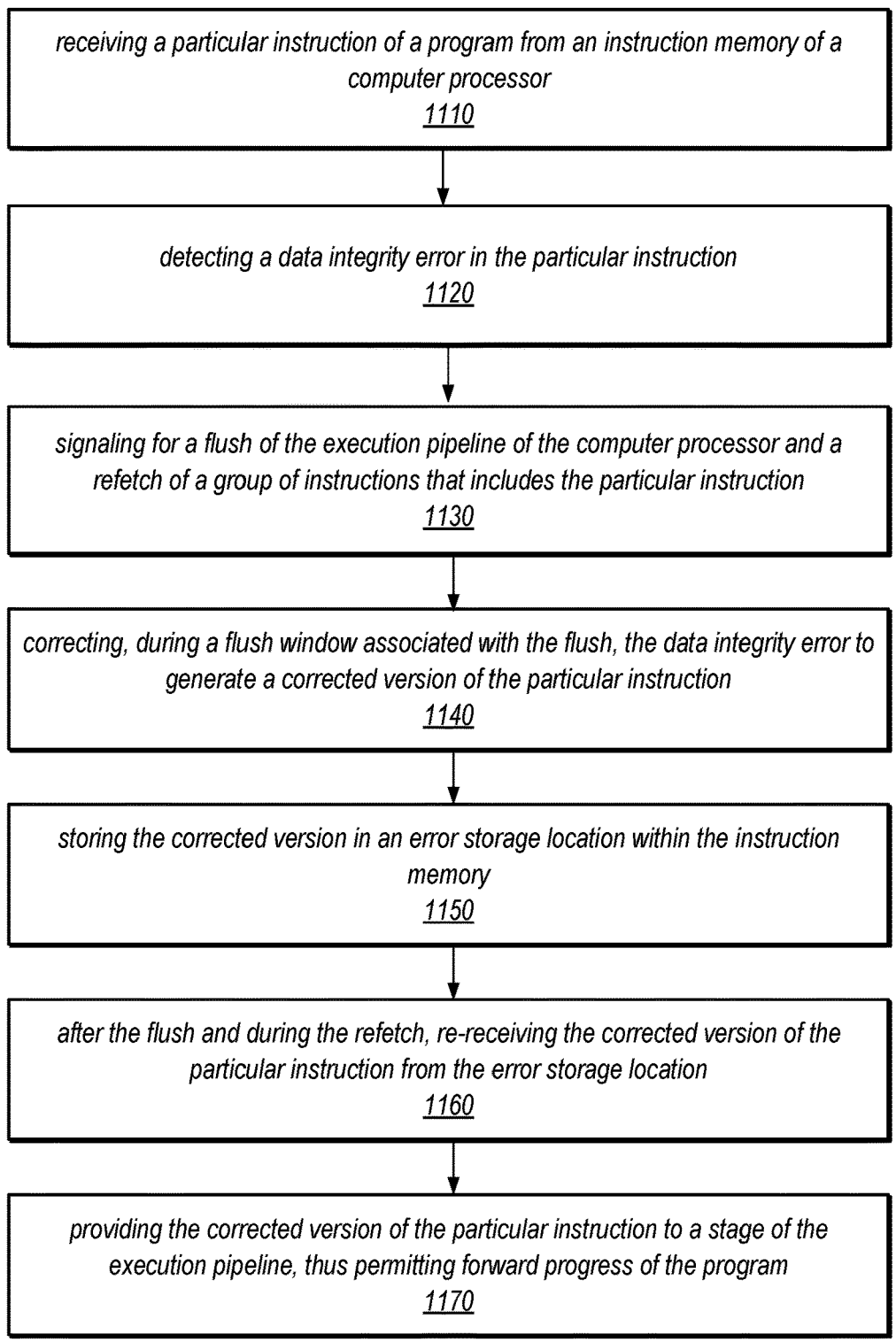
FIG. 11 is a flowchart illustrating one embodiment of a method for detecting and correcting an instruction error.

Turning now to FIG. 11, a flowchart of one embodiment of a method for detecting and correcting an instruction error is illustrated. Method 1100 may be performed by a circuit within a computer processor that is executing instructions of a program. In particular, method 1100 may be performed by a storage circuit such as instruction storage circuit 110 described throughout this disclosure. In some embodiments, method 1100 may be performed by a memory control circuit within the instruction storage circuit, where the memory control circuit is coupled to an instruction memory that includes an instruction storage and an error storage.

Method 1100 begins at 1110, in which the circuit receives, from the instruction memory, a particular instruction of the program. The instruction memory may be any of various types of memories, including an instruction cache. In some embodiments, the particular instruction is received in response to a request for the particular instruction from the instruction memory, where the request included an address for the particular instruction that was generated by the circuit.

In 1120, the circuit detects a data integrity error in the particular instruction. Examples of types of errors that may be detected include parity and ECC errors. Various actions are performed in response to the detecting; these actions correspond to reference numerals 1130, 1140, and 1150 in FIG. 11.

In 1130, the circuit signals for a flush of an execution pipeline of the computer processor and a refetch of a group of instructions that includes the particular instruction. Accordingly, in some embodiments, those instructions that are not sufficiently through the pipeline, including the particular instruction in which the error was detected, are flushed. An example of this process was shown with respect to FIG. 9. A time period known as a "flush window" exists between the signaling of the flush and when the circuit re-receives the particular instruction as result of a refetch of that instruction.

In 1140, the circuit corrects the data integrity error to generate a corrected version of the particular instruction during the flush window. In some embodiments, a corrected version is only generated for certain types of errors (e.g., single-bit errors). The correction may be performed by an ECC circuit in some implementations.

In 1150, the circuit stores the corrected version in an error storage location within the instruction memory. The error storage location may be implemented in various ways. As shown in FIG. 7D, the instruction memory may be implemented as a plurality of non-redundant storage banks and one or more redundant banks; the error storage location may be implemented in one of the redundant banks. Alternatively, the error storage location may be implemented as a single register. In some embodiments, the circuit may be able to handle only one persistent error at a time, meaning that if the error storage location is currently storing a corrected version of an instruction, any other errors may need to be handled via an alternate. One possibility, discussed with respect to FIG. 9, is to flush the pipeline again after the pipeline completes execution of the error-generating instruction.

Method 1100 then proceeds to 1160, which occurs after the flush and during the refetch of the group of instructions. In 1160, the circuit re-receives the corrected version of the particular instruction from the error storage location. In some embodiments, 1160 may be achieved using saved state information, as described above with reference to FIGS. 5 and 6.

Method 1100 concludes in 1170, in which the circuit provides the corrected version of the particular instruction to a stage of the execution pipeline. In the execution pipeline of FIG. 3, for example, the corrected version may be provided to a first fetch stage. Providing the corrected version of the particular instruction from error storage 228 rather than instruction storage 224 advantageously improves the chances of forward progress of the program.

Method 1100 may be supplemented in various ways. For example, the error detection may also indicate whether the error is correctable by the circuit or not. In some implementations, the circuit may be configured to correct single-bit errors but not multi-bit errors. Accordingly, the circuit may store an indication that the data integrity error is correctable by the circuit. Upon re-receiving the particular instruction, the circuit may provide, based on the stored indication, the corrected version of the particular instruction from the error storage location to the execution pipeline.

In some embodiments of method 1100, the particular instruction may still have the data integrity error even after refetch. In these embodiments, method 1100 may further include the circuit determining that a copy of the particular instruction reloaded into a storage location in the instruction memory still has the data integrity error. In response to this determination, the circuit may cause the storage location to be marked as faulty.

In some embodiments, not all detected errors are correctable. Non-correctable errors may be handled differently. In these embodiments, method 1100 may further include detecting that a different instruction other than the particular instruction has a data integrity error that is not correctable by the circuit. This error may be a multi-bit error in some implementations. In response to such a detection, the circuit may store an indication that the different instruction has a non-correctable data integrity error, and signal that an instruction access fault should be issued for the different instruction, where the instruction access fault causes the different instruction to be fetched from a higher-level memory and loaded into the instruction memory for a subsequent access. In some implementations, the fetch from higher-level memory may also be stored in the error storage location as well in case the instruction storage has a faulty location. In other implementations, the error storage location is not used when there is an uncorrectable error.

As discussed above, in some embodiments, the circuit supports handling only one data integrity error at a time. Accordingly, in these embodiments of method 1100, correction of data integrity errors in the program is suppressed upon detecting the data integrity error in the particular instruction. Method 1100 further comprises, after providing the corrected version of the particular instruction to the execution pipeline, clearing the error storage location, thus re-enabling detecting and correcting of data integrity errors in instructions fetched from the instruction memory.

Example Computer System

Figure 12:
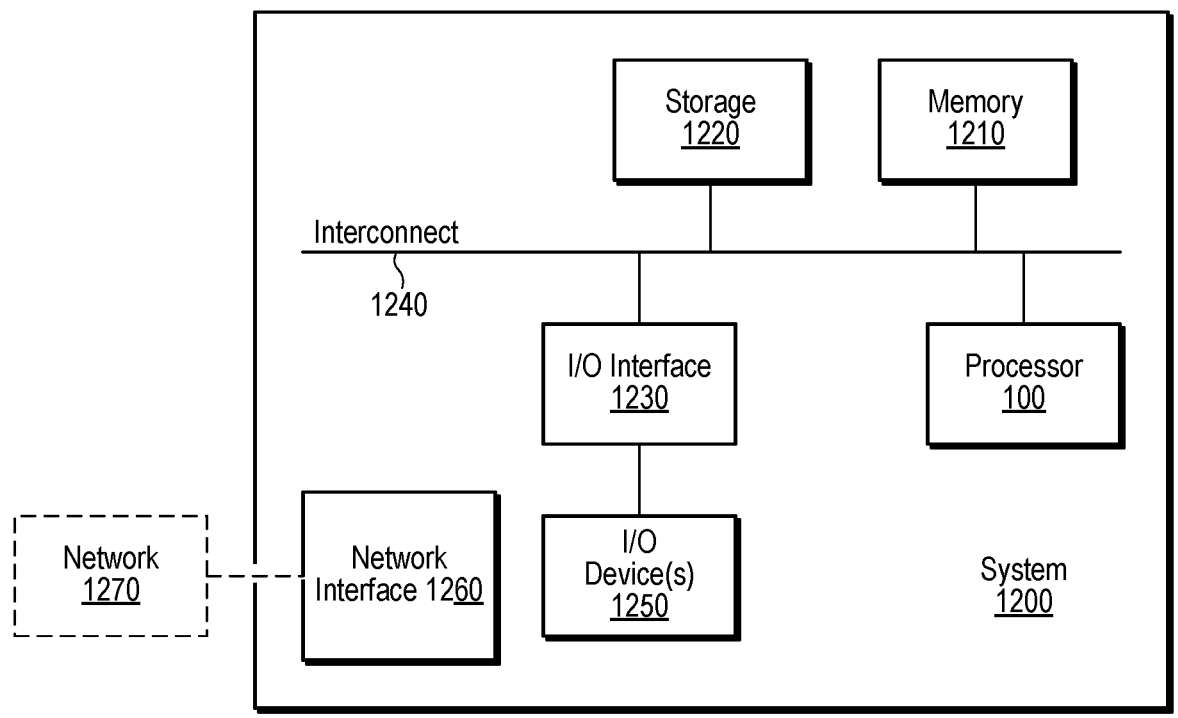
FIG. 12 is a block diagram of one embodiment of a computing device that includes a processor having an instruction storage circuit as described in the present disclosure.

Processor 100 described above with reference to FIG. 1 may be included within a variety of system configurations, one example of which is shown in FIG. 12. In various embodiments, system 1200 may correspond to a general-purpose computer system, such as a desktop or portable computer, a mobile phone, or the like. System 1200 may also correspond to any type of embedded system that may employ one or more instances of processor 100 as a dedicated controller. For example, system 1200 may correspond to any type of computer peripheral device such as a mass storage device or storage array, printer, or the like, as well as control systems for automobiles, aviation, manufacturing, and other suitable applications.

As shown, system 1200 includes processor 100, memory 1210, storage 1220, and an input/output (I/O) device interface 1230 coupled via an interconnect 1240. One or more I/O devices 1250 are coupled via I/O interface 1230. System 1200 also includes a network interface 1260 that may be configured to couple system 1200 to a network 1270 for communications with, e.g., other systems. (In various embodiments, network interface 1260 may be coupled to interconnect 1240 directly, via I/O interface 1230, or according to a different configuration.) It is noted that some or all of the components of system 1200 may be fabricated as a system-on-a-chip, although discrete combinations of components may also be employed.

Processor 100 may include an instruction storage circuit as disclosed above. Memory 1210 may include random-access memory (RAM) of any suitable configuration, such as working memory configured to store data and instructions usable by processor 100. Storage 1220 may include mass storage devices such as magnetic, optical, or nonvolatile/flash memory storage, or a combination of these. In some embodiments, either of memory 1210 or storage 1220 may be omitted or integrated into the other as a single memory subsystem from the perspective of processor 100.

I/O interface 1230 may be configured to interface between interconnect 1240 and one or more other types of buses or interfaces. For example, interconnect 1240 may correspond to the AHB interface discussed above (or another suitable type of high-bandwidth interconnect), and I/O interface 1230 may be configured as a bridge device that enables coupling of different types of I/O devices to interconnect 1240. I/O interface 1230 may implement one or more interface protocols such as Universal Serial Bus, Firewire, or other suitable standards. I/O device(s) 1250 may include any suitable type of storage, network interface, user interface, graphics processing, or other type of device. Network 1270, if present, may be any suitable type of wired or wireless communications network, such as an Internet Protocol (IP) addressed local or wide-area network, a telecommunications network, or the like. Network interface 1260, if present, may be configured to implement any suitable network interface protocol needed for communication with network 1270.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]— is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U. S. C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements are defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   an instruction storage circuit that includes: an instruction memory configured to store a plurality of instructions, wherein the instruction memory includes an error storage circuit;
   a memory control circuit configured to: retrieve a particular instruction from the instruction memory; detect a data integrity error in the particular instruction; generate and store a corrected version of the particular instruction in the error storage circuit; and in response to receiving a subsequent request to retrieve the particular instruction, cause a response to the subsequent request to be provided from the error storage circuit, wherein the memory control circuit, in response to detecting that a different instruction has a data integrity error that is a multi-bit error, is further configured to: retrieve, from a higher-level memory, a cache line that includes the different instruction.

2. The apparatus of claim 1, further comprising: an execution pipeline configured to execute instructions received from the instruction storage circuit; and a trap logic circuit configured, in response to detecting the data integrity error, to cause a flush of instructions from the execution pipeline and a refetch of a group of instructions that includes the subsequent request for the particular instruction.

3. The apparatus of claim 2, wherein the memory control circuit, in response to the data integrity error being a single-bit error, is further configured to perform an ECC-correction operation on the particular instruction to generate the corrected version of the particular instruction for storage in the error storage circuit.

4. The apparatus of claim 3, wherein the memory control circuit, in response to detecting that a different instruction has a data integrity error that is a multi-bit error, is further configured to: write the different instruction from the retrieved cache line to the error storage circuit; write the cache line to an instruction storage in the instruction memory; and wherein the memory control circuit, in response to a refetch of the different instruction, is further configured to: cause the different instruction to be provided to the execution pipeline from the error storage circuit; and check whether a version of the different instruction stored in the instruction storage matches a version of the different instruction stored in the error storage circuit.

5. The apparatus of claim 2, wherein the memory control circuit is further configured to: store the corrected version of the particular instruction to a corresponding location in the instruction memory; in response to the subsequent request to retrieve the particular instruction: determine that a corrected version of the particular instruction has been stored in the error storage circuit; and provide the corrected version of the particular instruction from the error storage circuit to the execution pipeline.

6. The apparatus of claim 5, wherein the memory control circuit is further configured, in response to the subsequent request to retrieve the particular instruction, to: retrieve the corrected version from the corresponding location in the instruction memory; and if the corrected version has a data integrity error, mark the corresponding location in the instruction memory as faulty.

7. The apparatus of claim 1, wherein the instruction storage circuit includes multiple memory banks, and wherein the error storage circuit includes first and second error buffers; and wherein the memory control circuit is further configured, in response to the particular instruction spanning two of the multiple memory banks, to store the corrected version of the particular instruction using portions of the first and second error buffers.

8. The apparatus of claim 1, wherein one or more error buffers in the error storage circuit are implemented using flip-flops, and wherein other memory cells in the instruction memory are implemented using SRAMs.

9. The apparatus of claim 1, wherein the memory control circuit is further configured to track data integrity errors in instructions in the instruction storage circuit over time.

10. A method, comprising:
receiving, by a circuit of a computer processor executing a program, a particular instruction of the program, wherein the particular instruction is received from an instruction memory of the computer processor;
detecting, by the circuit, a data integrity error in the particular instruction; in response to the detecting, performing, by the circuit:
signaling for a flush of an execution pipeline of the computer processor and a refetch of a group of instructions that includes the particular instruction;
correcting, during a flush window associated with the flush, the data integrity error to generate a corrected version of the particular instruction; and
storing the corrected version in an error storage location within the instruction memory;
after the flush and during the refetch, re-receiving, by the circuit, the corrected version of the particular instruction from the error storage location; and
providing, by the circuit, the corrected version of the particular instruction to a stage of the execution pipeline, thus permitting forward progress of the program, wherein the circuit, in response to detecting that a different instruction has a data integrity error that is a multi-bit error, is further configured to: retrieve, from a higher-level memory, a cache line that includes the different instruction.

11. The method of claim 10, further comprising: storing, by the circuit, an indication that the data integrity error is correctable by the circuit; and upon re-receiving the particular instruction, providing, based on the stored indication, the corrected version of the particular instruction from the error storage location to the stage of the execution pipeline.

12. The method of claim 10, further comprising: determining, by the circuit, that a copy of the particular instruction reloaded into a storage location in the instruction memory still has the data integrity error; and in response to the determining, causing, by the circuit, the storage location to be marked as faulty.

13. The method of claim 10, further comprising: in response to detecting, by the circuit, that a different instruction has a data integrity that is not correctable by the circuit: storing, by the circuit, an indication that the different instruction has a non-correctable data integrity error; and signaling that an instruction access fault should be issued for the different instruction, wherein the instruction access fault causes the different instruction to be fetched from a higher-level memory and loaded into the instruction memory for a subsequent access.

14. The method of claim 10, wherein correction of data integrity errors in the program is suppressed upon detecting the data integrity error in the particular instruction, and wherein the method further comprises: after providing the corrected version of the particular instruction to the execution pipeline, clearing the error storage location, thus re-enabling detecting and correcting of data integrity errors in instructions fetched from the instruction memory.

15. An apparatus, comprising:
an instruction storage circuit that includes an instruction memory, wherein the instruction memory includes a redundant portion;
a trap logic unit; and
an execution pipeline;
wherein the instruction storage circuit is configured to: receive a request for a particular instruction; detect, in a storage location in the instruction memory, a data integrity error in the particular instruction; in response to detecting the data integrity error, signal the trap logic unit to cause a flush of instructions from the execution pipeline; generate, during a flush window associated with the flush, a corrected version of the particular instruction; store the corrected version in the redundant portion of the instruction memory; receive a re-request for the particular instruction during a refetch of a group of instructions from the instruction memory, wherein the refetch occurs after the flush; and in response to the re-request, provide, to the execution pipeline from the redundant portion of the instruction memory, the corrected version of the particular instruction, wherein the data integrity error is a single-bit error, and wherein the instruction storage circuit is further configured, in response to detecting a multi-bit error in a different instruction in the instruction memory, to: send an indication of the multi-bit error to the execution pipeline along with the different instruction without correcting the multi-bit error; and wherein the trap logic unit is configured to take an instruction access fault on the different instruction in response to receiving the indication of the multi-bit error, wherein the instruction access fault includes retrieving the different instruction from a higher-level memory.

16. The apparatus of claim 15, wherein the instruction memory includes a plurality of memory banks, and wherein the redundant portion of the instruction memory includes at least one of the plurality of memory banks.

17. The apparatus of claim 16, wherein the redundant portion includes two memory banks configured to store an instruction that straddles memory banks.

18. The apparatus of claim 15, wherein the instruction storage circuit is further configured to also store the corrected version in a storage location of a non-redundant portion of the instruction memory; and wherein, in response to the re-request, the instruction storage circuit is further configured to compare the corrected version stored in the non-redundant and redundant portions of the instruction memory to determine if there is a persistent error in the non-redundant portion of the instruction memory.

19. The apparatus of claim 18, wherein the instruction storage circuit, in response to determining there is a persistent error in the non-redundant portion of the instruction memory, is further configured to store an indication that a subsequent request to the storage location is to be remapped to a different storage location.

* * * * *